(12) United States Patent
Hall et al.

(10) Patent No.: US 12,515,740 B2
(45) Date of Patent: Jan. 6, 2026

(54) VEHICLE WITH NORMAL AND DIFFERENTIAL STEERING MODES

(71) Applicant: Vanderhall Motor Works, Inc., Provo, UT (US)

(72) Inventors: Stephen Hall, Draper, UT (US); Christopher Johnson, Provo, UT (US); Andrew Sims, Provo, UT (US)

(73) Assignee: Vanderhall Motorworks, Inc., Provo, UT (US)

( * ) Notice: Subject to any disclaimer, the term of this patent is extended or adjusted under 35 U.S.C. 154(b) by 394 days.

(21) Appl. No.: 18/166,428

(22) Filed: Feb. 8, 2023

(65) Prior Publication Data

US 2023/0278627 A1    Sep. 7, 2023

Related U.S. Application Data

(60) Provisional application No. 63/307,683, filed on Feb. 8, 2022.

(51) Int. Cl.

| | |
|---|---|
| *B62D 11/02* | (2006.01) |
| *B62D 1/04* | (2006.01) |
| *B62D 6/00* | (2006.01) |
| *B62D 7/15* | (2006.01) |
| *B62D 11/00* | (2006.01) |
| *B62D 11/04* | (2006.01) |

(Continued)

(52) U.S. Cl.
CPC .......... *B62D 11/003* (2013.01); *B62D 7/1509* (2013.01); *B62D 11/04* (2013.01); *B62D 15/021* (2013.01); *B62D 1/046* (2013.01); *B62D 6/007* (2013.01); *B62D 55/00* (2013.01); *B62D 61/065* (2013.01)

(58) Field of Classification Search
CPC ...... B62D 1/046; B62D 6/007; B62D 7/1509; B62D 11/003; B62D 11/04; B62D 15/021; B62D 55/00; B62D 61/065
See application file for complete search history.

(56) References Cited

U.S. PATENT DOCUMENTS

| | | | |
|---|---|---|---|
| 11,124,231 B2 * | 9/2021 | Hiroe | .................... B62D 7/1509 |
| 11,590,977 B2 * | 2/2023 | Keller | ...................... B60K 1/02 |

(Continued)

FOREIGN PATENT DOCUMENTS

| | | | | | |
|---|---|---|---|---|---|
| CN | 105857393 | A | * | 8/2016 | ............. B62D 12/00 |
| CN | 110466602 | A | * | 11/2019 | ............... B62D 6/00 |

(Continued)

*Primary Examiner* — Adam D Rogers

(57) ABSTRACT

A vehicle configured to operate in a normal steering mode and a differential steering mode is disclosed. The vehicle includes at least three wheels with the first and second wheels disposed on opposite sides of the vehicle. First and second motors, independently controllable by a motor control unit, drive the corresponding wheels. A steering shaft connects a steering mechanism for changing the angle of travel of at least one wheel to a steering wheel, when the vehicle operates in the normal steering mode. When the vehicle operates in a differential steering mode, a steering lock mechanism locks the at least one wheel in a fixed angle of travel, and a sensor senses the direction the steering wheel is turned. The motor controller causes the motor to rotate the first and second wheels at different rotational speeds to turn the vehicle the direction the steering wheel is turned.

20 Claims, 23 Drawing Sheets

(51) Int. Cl.
    *B62D 15/02*     (2006.01)
    *B62D 55/00*     (2006.01)
    *B62D 61/06*     (2006.01)

(56) References Cited

U.S. PATENT DOCUMENTS

| | | | |
|---|---|---|---|
| 11,634,172 B2 * | 4/2023 | Nakata | B62D 5/0481 |
| | | | 701/41 |
| 12,024,160 B2 * | 7/2024 | Verbridge | B60K 35/28 |
| 12,145,573 B2 * | 11/2024 | Cao | B60K 17/354 |
| 2021/0206430 A1 * | 7/2021 | North | B62D 11/04 |
| 2023/0271655 A1 * | 8/2023 | Wei | B60B 19/12 |
| | | | 180/7.1 |

FOREIGN PATENT DOCUMENTS

| | | | | |
|---|---|---|---|---|
| DE | 102014220869 A1 * | 4/2015 | | B60W 10/08 |
| DE | 102018212031 A1 * | 1/2020 | | B60W 30/045 |
| EP | 2583882 A1 * | 4/2013 | | B62D 9/002 |
| GB | 2358004 A * | 7/2001 | | B60G 17/0162 |
| JP | 2006335171 A * | 12/2006 | | B60T 8/1755 |

\* cited by examiner

VEHICLE WITH NORMAL AND DIFFERENTIAL STEERING MODES

CROSS-REFERENCE TO RELATED APPLICATIONS

This application is a continuation-in-part of U.S. Provisional Patent Application No. 63/307,683, filed Feb. 8, 2022, and entitled "Systems and Devices for Wheeled Vehicle Tank Steer," the entire disclosure of which is incorporated herein by reference.

TECHNICAL FIELD

This application relates to vehicle steering systems, in particular systems for enabling differential steering.

BACKGROUND

Steering is a vital part of traveling in a vehicle. There are several methods by which a vehicle is steered. Since the advent of the automobile, wheeled vehicles have been steered by changing the angle of travel of some steerable wheels. The first automobiles were steered using a tiller, which is a lever attached to the front wheels that controlled their direction of travel. Innovation and a need for intuitive steering of the vehicles lead to the replacement of the tiller by the steering wheel. A steering wheel was easier to use and gave greater control over the angle of travel of the wheels. Using a steering wheel to change the angle of travel of wheels to steer a vehicle has become ubiquitous in driving wheeled vehicles. Tracked vehicles such as bulldozers, snowcats, and tanks are steered by another method. These tracked vehicles steer by changing the speed of the tracks. The speed of the tracks is generally controlled by two levers, one for each track. Rotating one track will cause the tracked vehicle to turn in one direction, while rotating the other track will cause the tracked vehicle to move in the other direction. Rotating both tracks in the same direction will cause the vehicle to move forward. Each of these steering methods have advantages that are preferred in specific conditions.

SUMMARY

In a first aspect, the disclosure provides a vehicle configured to operate in a normal steering mode and a differential steering mode. The vehicle comprises a first, second and third wheel, with the first and second wheels disposed on opposite sides of the vehicle. A first and second motor, each independently controllable by a motor controller to rotate at varying rotational speeds, with the first motor driving the first wheel and the second motor driving the second wheel. A steering wheel connected by a steering shaft to a steering mechanism to change the angle of travel of at least one of the first, second, and third wheels when the vehicle is operating in the normal steering mode. A steering lock mechanism to lock the steering mechanism and thereby lock the angle of travel of the at least one of the first, second and third wheels in a fixed angle of travel when the vehicle is operating in the differential steering mode. A sensor for sensing the direction the steering wheel is turned, at least when the vehicle is operating in the differential steering mode. When the vehicle is operating in the differential steering mode, a signal from the sensor is received by the motor controller, whereupon the motor controller causes the first and second motors to rotate the first and second wheels at different rotational speeds to thereby turn the vehicle in the same direction the steering wheel is turned.

In a second aspect, the disclosure provides a vehicle configured to operate in a normal steering mode and a differential steering mode. The vehicle comprises a first, second, third, and fourth wheel with the first and second wheels disposed on opposite sides of the vehicle and with the third and fourth wheels disposed on opposite sides of the vehicle. A first and second motor, each independently controllable by a motor controller to rotate at varying rotational speeds, with the first motor driving the first wheel and the second motor driving the second wheel. A steering wheel connected by a steering shaft to a steering mechanism to change the angle of travel of either the first and second wheels or the third and fourth wheels when the vehicle is operating in the normal steering mode. A steering lock mechanism to lock the steering mechanism and thereby lock the angle of travel of the wheels, whose angle is otherwise changed by the steering mechanism when the vehicle is operating in the differential steering mode. A sensor for sensing the direction the steering wheel is turned, at least when the steering lock mechanism is engaged when the vehicle is operating in the differential steering mode. When the vehicle is operating in the differential steering mode, a signal from the sensor is received by the motor controller, whereupon the motor controller causes the first and second motors to rotate the first and second wheels at different rotational speeds to thereby turn the vehicle in the same direction the steering wheel is turned.

Further aspects and embodiments are provided in the foregoing drawings, detailed description, and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

Figure 1A:
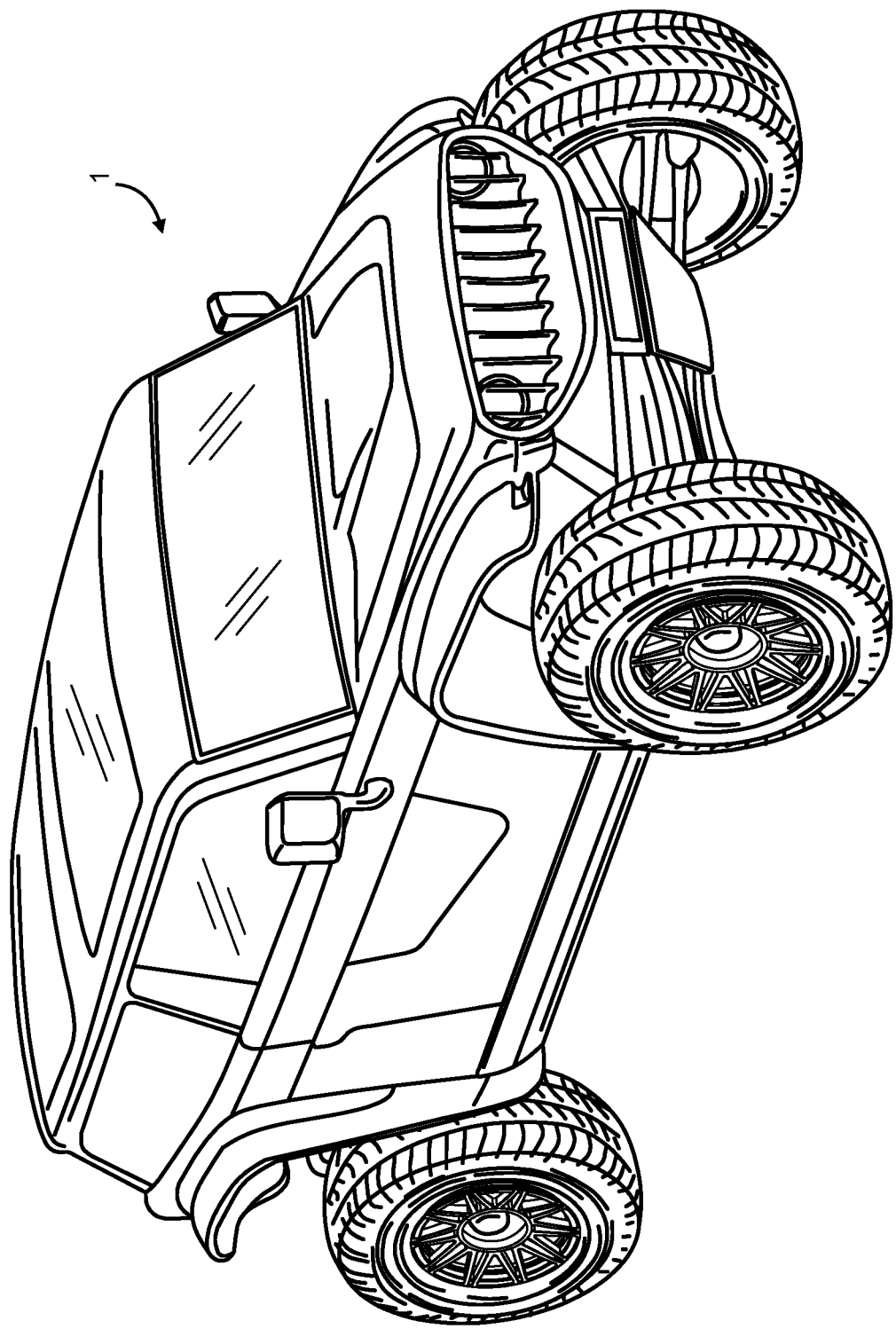
FIG. 1A illustrates an off-road wheeled vehicle equipped with a normal and differential steering system, according to an embodiment.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like. As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, the term "differential steering" refers to using the rotational speed of the wheels on a vehicle to steer the vehicle. When the wheels on opposite sides of a vehicle rotate at different speeds, the vehicle will turn toward the wheels that are rotating at a slower speed.

Throughout this disclosure reference will be made to sides of a vehicle. The vehicles will be described according to the convention used by the United States for placement of a steering wheel in a vehicle. In the United States (and many other countries) the steering wheel is positioned on the left side of the vehicle. In describing sides, an imaginary line bifurcates a vehicle longitudinally. This line through the longitudinal axis divides the driver side, or the left side, from the passenger side, or the right side. Any reference to driver side, therefore, is referring to the left side, and any reference to passenger side is referring to the right side. It can further be understood that when discussing the left or right side, it would be from the perspective of a person facing forward in the vehicle.

A conventional system for steering a vehicle may include a steering apparatus. The steering apparatus is the method of controlling a bearing or orientation of a vehicle, The steering apparatus may, for example, include a steering wheel. The steering wheel may be linked to one or more wheels of the vehicle. Turning the steering wheel may cause the vehicle wheels to pivot about a transverse axis of each steered vehicle wheel. The transverse axis being perpendicular to a rotational axis about which the vehicle wheel rotates as the vehicle travels over a surface. When the steering wheel is turned, the angle of travel changes. A neutral position of a steering wheel, and steering system, is when the steering wheel is positioned so that the angle of travel of the steerable wheels is in line with the longitudinal axis of the vehicle. Rotating the wheels at the same speed will cause the vehicle to move in a straight line. In other words, the neutral position of the steering wheel will maintain the bearing of the vehicle, provided the wheels rotate at the same speed. Another steering apparatus may include one or more control sticks. A change in the orientation of the vehicle may be caused by the rotational speed of wheels on one side of the vehicle being different from the rotational speed of wheels on the opposite side of the vehicle. Operator interaction with the control stick may control the difference in speed.

As used herein, "rotational speed" is meant to refer to the speed at which a wheel is rotated. In some embodiments, the wheels of a vehicle are rotated by motors. In some embodiments each wheel is rotated by its own motor. This enables each motor to rotate each wheel at its own speed, therefore each wheel is independently rotated. In some embodiments, a motor rotates multiple wheels. In embodiments where one motor rotates multiple wheels, each motor will rotate the wheels on one side of a vehicle. The wheels on each side of a vehicle will rotate independent of the wheels on the other, or opposite, side of a vehicle.

Rotational speed of the wheel can be rotation in either direction. One way of thinking about rotational speed in different directions could be to think of one direction, for example, the forward direction as a positive speed, and to think of the other direction as a negative speed. Therefore, if a wheel on one side, for example the right front wheel rotates in a forward direction it has a positive speed and if a wheel on the opposite side, for example, the left front wheel rotates in a backward direction it has a negative speed. The motors connected to each of these wheels could rotate the wheels in opposite directions, the wheels would therefore have different rotational speeds. When the wheels are rotated in opposite directions, they may be rotating at the same magnitude, but because they are rotating in different directions, they are rotating at different rotational speeds.

Unfortunately, conventional systems limit vehicle use based on the type of steering apparatus used in the vehicle. For example, a vehicle with four wheels and two steerable wheels is generally limited to turn radii that exceed the length of the vehicle because the maximum turn angle of the steerable wheels is generally limited by other features of the vehicle, such as the chassis, axels, suspension, and so forth. Even in vehicles where the maximum turn angle of the steerable wheels is ninety degrees, the shortest turn radius may be approximately the length of the vehicle. Vehicles with shorter turn radii, such as those where front and back wheels turn in opposite directions or that use differential wheel speeds to turn, may not be capable of operation at higher speeds. The shorter turn radii may cause the vehicle to be unstable when turning at high speeds.

Differential steering is a means of steering a wheeled vehicle by rotating the wheels on one side of the vehicle at a different rotational speed than the wheels on the other side of the vehicle. Differential steering is used on many types of vehicles, and while the primary means of steering tracked vehicles such as bulldozers, it is not limited to such applications. Differential steering can be implemented by several different mechanisms. These mechanisms include clutch-brake steering, braked-differential steering, controlled-differential steering, geared differential steering, and electric differential steering.

Electric differential steering on a wheeled vehicle utilizes two or more electric motors, at least one per side and as many as one per wheel. The different motors are able drive the wheels on opposite sides at different speeds.

Differential steering requires rotating at least two wheels, each on opposite sides of the vehicle, at different speeds. In some embodiments, there are two motors, each motor driving a wheel on each side of the vehicle. In some of these embodiments, the motor driving one of the wheels does not rotate a wheel, while the motor driving the opposing wheel rotates the wheel. The rotation of one wheel on one side of the vehicle will turn the vehicle toward the wheel which is not rotating on the other side of the vehicle. For example, to turn to the left, the motor driving the left wheel will not rotate the left wheel, and the motor driving the right wheel will rotate the right wheel in a forward direction. To turn right, the motor driving the right wheel will not rotate the right wheel, and the motor driving the left wheel will rotate the left wheel in the forward direction. In another embodiment, both wheels are rotated, and one wheel is rotated faster than the opposing wheel. The faster rotating wheel will turn the vehicle toward the slower rotating wheel. In embodiments where both wheels continue to be rotated, the differential steering can be used to augment the steering provided by the steering mechanism. In some embodiments, one of the opposing wheels has a brake applied to it while the other is driven. In embodiments utilizing brakes to change the speed of rotation of the opposing wheels, the differential steering can be used to augment the steering provided by the steering mechanism. By augmenting the steering provided by the steering mechanism a vehicle would be enabled to turn in a tighter radius than enabled with the use of the steering mechanism alone. This is beneficial in instances where space is limited for turning, some examples include dry riverbeds, treelined trails, or small alleyways. Additionally, augmenting the steering mechanism would enable tighter donuts. These modes will be referred to as differential assist mode.

In some embodiments, all the wheels of a vehicle are driven. In some of these embodiments, all the wheels on one side of the vehicle are driven by one motor and all the wheels on the opposite side are driven by another motor. In some other embodiments, each wheel is driven by its own motor. In embodiments where all the wheels are driven, when all the wheels on one side of the vehicle are driven in one direction and all the wheels on the opposite side of the vehicle are driven in the opposite direction at the same rotational magnitude, the vehicle will rotate about the center point of all the wheels. This type of differential steering is often referred to as tank steering. Differential steering is to be distinguished from tank steering in that tank steer is a subset of differential steering. Tank steering refers to all the wheels on one side of a vehicle rotating in one direction and all the wheels on the other side of the vehicle rotating in the opposite direction. When the wheels on one side of the vehicle rotate at a different speed than the wheels on the opposite side of the vehicle, the vehicle will turn around a point like a donut. The donut can be tightened by rotating the wheels on one side faster than the wheels on the other side. When the wheels are rotating in opposite directions, the vehicle will pivot on a point like a top.

A vehicle may include one or more electric motors. Each electric motor may drive one or more wheels of the vehicle. The vehicle may include a battery electrically coupled to each electric motor. The vehicle may include an electronic power steering (EPS) module electrically coupled to the battery and mechanically coupled to one or more of the wheels. The EPS module may include a steering wheel, a differential steering interface, sometimes referred to as a tank steer interface, and a motor controller system. The steering wheel may be coupled to a steering shaft. The differential steering or tank steer interface may be mechanically or electrically coupled to the steering wheel and a power assist system. The power assist system may be coupled to the steering shaft and one or more of the wheels.

The motor controller of the motor controller system may be electrically coupled to the battery, the EPS module, and/or the electric motors. The motor controller system may include one or more processing devices or motor controllers and one or more memory devices. The memory devices may store instructions executable by the one or more processing devices or motor controllers to change a bearing of the vehicle by adjusting a rotational speed of at least one wheel. Adjusting the rotational speed of the wheels may occur in response to receiving an input signal from the motor controller or from the differential steering or tank steer interface, depending on the systems available with the vehicle.

The memory of the motor controller system may include instructions associated with a steering mode of the vehicle. These instructions are executable by the motor controller. These steering modes include normal steering mode, differential assist mode, and differential steering mode or tank steer. These modes are selected by the user, and the vehicle is provided with a steering mode selection system. In some embodiments, the steering mode selection system is a dial with different steering mode icons arranged around it. In some embodiments, the steering mode selection system is a series of buttons. In some embodiments, the steering mode selection system is a lever. In some embodiments, the steering mode selection system is a menu on a touch screen interface. In some embodiments, the steering mode is selected by voice interface, such as saying "select differential assist mode."

Normal steering mode is the system used by nearly all cars, where turning a steering wheel turns the steerable wheels of a vehicle. This is the steering that is learned in drivers' education classes and has been in use since the early twentieth century, when the steering wheel became commonplace in vehicles. In a normal steering mode, a turn of the steering wheel translates to a turn, or a change in the angle of travel, of the steered wheel or wheels.

Differential assist steering mode will augment the normal steering of the vehicle. In a differential assist steering mode, the wheels are rotated at different speeds to help the normal steering of the vehicle. Most often the steered wheels are the front wheels of the vehicle. Changing the angle of the steered wheels turns the vehicle. Differential assist steering augments the turning of the vehicle. For example, when the steered wheels are turned to the right, the angle of the wheels is to the right, the vehicle will turn to the right. The vehicle is limited by the length of the vehicle and the angle to which the wheels can be turned. Most vehicles can only turn the wheels to 45 degrees. This limits how sharp a turn a vehicle can take. By changing the rotation speed of the wheels, a turn may be made tighter. Turning the steering wheel to the right and rotating the wheels on the left side of the vehicle faster than the wheels on the right side of the vehicle will tighten the radius of the turn. As the radius of the turn is tightened, the size of the donut created by the vehicle is decreased.

Differential steering mode uses rotational speed of the wheels to turn the vehicle. In differential steering mode, the steerable wheels are locked parallel to the longitudinal axis of the vehicle. The wheels on opposing sides of the vehicle are rotated at different rotational speeds. In some embodiments, the wheels on both sides of the vehicle rotate in the same direction, and the wheels on one side rotate faster than the wheels on the other side. For example, a vehicle is placed in a differential steering mode and the steering is turned to the right. The wheels remain in their parallel orientation and the wheels on the left rotate faster than the wheels on the right. Alternatively, turning to the right the wheels on the left rotate faster than the wheels on the left. In another embodiment, turning the vehicle to the right, the wheels on the left rotate in the forward direction and the wheels on the right rotate in the reverse direction. When the vehicle has an even number of wheels and all the wheels on one side are rotated in one direction while all the wheels on the other side are rotated in the opposite direction, the vehicle will pivot on a point, or spin like a top on that point. This is commonly referred to as tank steering. Tank steering is a subset of differential steering. And will be used throughout this disclosure to refer to embodiments when the wheels on opposite sides of a vehicle are rotated in opposite directions at the same speed, pivoting the vehicle on a point, like a spinning top.

In some embodiments, the steering shaft and/or steering wheel may be locked in place and prevented from rotating, limited in range of rotation, moved out of alignment with the steering mechanism, or the torque required to rotate the steering shaft may be significantly increased. The EPS module may include a steering wheel lock, activated by the motor controller system, that prevents, reduces, or increases the torque required for turning the steering wheel or turning a steered wheel. The wheel lock may be magnetic, electromagnetic, and/or electromechanical. The wheel lock may be mechanical and may be engaged manually. The memory of the motor controller system may include instructions for determining a steering mode of the vehicle, activating the wheel lock in either the differential steering or tank steer mode, and deactivating the wheel lock in the normal steer mode. In the differential steering or tank steer mode, the motor controller system may initiate the instructions to activate the differential steering or tank steer interface. In the normal steer mode, the differential steering or tank steer interface may be deactivated. In normal steering mode the power steering assist system assist helps turn the wheels, making it easier to steer the vehicle. In differential steering mode, the power steering assist system inhibits turning the steering wheel, effectively becoming a steering mechanism lock. As the steering wheel is turned, the power assist motor measures the force required to turn the steering wheel. The force is measured by the current produced as the steering wheel is turned. The amount of current required to turn the steering wheel is relayed to the motor controller and the motor controller rotates the wheels based on the current. A higher current will result in the wheels rotating faster.

In some embodiments, the selection of differential steering mode requires the vehicle be stopped and have the steering wheel positioned in a substantially neutral position. A neutral steering wheel position is where the steering wheel is positioned when the vehicle is moving forward in a straight line. It can be thought of as 0°. Rotation of the steering wheel away from the neutral or 0° position is then thought of in degrees to the driver side or degrees to the passenger side. A substantially neutral position is a position within about 5° to the driver side or 5° to the passenger side. The range covered by substantially neutral therefore encompasses about 10°.

In some alternative embodiments, the steering mode of the vehicle may be automatically set based on a speed at which the vehicle is traveling. The motor controller system may determine a speed of the vehicle and compare the speed to a threshold or a limit. The threshold or limit may, for example, be any speed below five miles per hour. Once the vehicle has automatically changed the steering mode based on the speed limit or threshold, the user may elect to continue utilizing that driving mode within a predetermined range. The predetermined range may be from five miles per hour to twenty miles per hour, or from ten miles per hour to fifteen miles per hour. At or above the limit, the motor controller system may put the vehicle into normal steering mode. The wheel lock and/or differential steering or tank steer interface may be automatically deactivated. At or below the limit, the motor controller system may put the vehicle into differential steering or tank steer mode. The wheel lock and/or differential steering or tank steer interface may be automatically activated. The threshold speed may be fixed or dynamic. For example, the vehicle may include a gyroscope electronically coupled to, or part of, the motor controller system. The motor controller system may determine a roughness of the terrain on which the vehicle is traveling based on one or more signals output by the gyroscope. The threshold speed may be set lower for rougher terrain and higher for smoother terrain. The steering mode may also be set within defined operational parameters such as within a range of 2 miles per hour to twenty miles per hour.

To turn the vehicle, the motor controller system may adjust the rotational speed of the wheels on one side of the vehicle in one direction, and/or may adjust the rotational speed of the wheels on the other side of the vehicle in the opposite direction. For example, the vehicle may be turned right by increasing the rotational speed of the wheels on the left side of the vehicle, decreasing the rotational speed of the wheels on the right side of the vehicle, rotating the left-side wheels forward while rotating the right-side wheels in opposite directions, keeping the right-side wheels stationary while rotating the left-side wheels forward, keeping the left-side wheels stationary while rotating the right-side wheels in reverse, and so forth. Similarly, the vehicle may be turned left by increasing the rotational speed of the wheels on the right side of the vehicle, decreasing the rotational speed of the wheels on the left side of the vehicle, rotating the right-side wheels forward while rotating the left-side wheels backward, keeping the left-side wheels stationary while rotating the right-side wheels forward, keeping the right-side wheels stationary while rotating the left-side wheels in reverse, and so forth.

In some embodiments, the motor controller is programmed to change driving modes based on a user selection. In this way the user or driver is always aware of the driving mode the vehicle is in and can operate the vehicle within the parameters of the selected drive mode. In some alternative embodiments, the motor controller system may be programmed to automatically select a differential steering or tank steer mode or method based on a speed of the vehicle and/or a rotational speed of the wheels. The differential steering or tank steer interface may include separate controls for the left- and right-side wheels. The operator may use the separate controls to select and/or control the differential steering or tank steer mode or method.

The differential steering or tank steer interface may include one or more visual indicators, such as lights. The indicators may be disposed on the steering wheel, integrated into the steering wheel, disposed on the differential steering or tank steer interface, or integrated into the differential steering or tank steer interface. The motor controller system may activate and/or illuminate the indicators when the vehicle is switched into differential steering or tank steer mode and deactivate and/or turn off the indicators when the vehicle is switched into normal steer mode. The indicators may have different active states for each of the differential or tank and normal steer modes. For example, the steering wheel may be illuminated red in differential steering or tank steer mode and blue in normal steer mode.

The motor controller of the motor controller system may adjust the rotation speed of the wheels based on a current magnitude of the rotational speed of the wheels or a translational speed of the vehicle. The motor controller may adjust the rotational speed of the wheels based on instructions for adjusting the rotational speed of the wheels. This adjustment may be based on a magnitude of the input signal. The input signal magnitude may be commensurate with an input magnitude via the differential steering or tank steer interface. The input magnitude may be binary, and the input signal detected by the motor controller system may be binary—e.g., either on or off. The motor controller system may automatically adjust the rotational speed of the wheels in a binary fashion, rapidly and/or instantaneously ramping up to a maximum speed or down to a minimum speed. The motor controller system may automatically adjust the rotational speed of the wheel at a slower rate, in essence mimicking a variable-magnitude input. The differential steering or tank steer interface may output a variable signal, such as via a potentiometer. The input magnitude may be variable, and the input signal may accordingly be variable. The change in the rotational speed of the wheels may change proportionally with the change of the input magnitude.

The differential steering or tank steer interface may include the steering wheel, the steering shaft, and/or a strain gauge coupled to the steering shaft. The strain gauge may measure a strain on the steering shaft, or the steering wheel caused by a torque on the steering wheel as the steering wheel or steering shaft is in a locked, rotation-limited state, or the steering shaft is disengaged from the steering mechanism. In such an implementation, the input signal may include a strain signal output by the strain gauge. The magnitude of the strain signal may correspond to the magnitude of the torque on the steering shaft or steering wheel.

The differential steering interface or tank steer interface may include a lever. The lever may be positioned on the steering wheel, the steering shaft, or otherwise within reach of the steering wheel while the operator's hand is on the steering wheel. The lever may be or include one or more of an electronic switch, a potentiometer, a toggle switch, a selector switch, and so forth. The magnitude of the input signal may correspond to a length of travel of the lever. The differential steering interface or tank steer interface may include one or two thumb switches on the operator-side of the steering wheel. The differential steering interface or tank steer interface may include one or two paddles on opposite sides of the steering wheel from each other.

In some embodiments, the wheels are replaced by tracks or skids. In some of these embodiments, the steering mode selector includes an option to select tracks or skids. In some other embodiments, the steering mode selector does not include a track or skid option, therefore, to use the tracks or skids, the user would select the differential steering mode. In some other embodiments, the motor controller system, which may include and/or communicate with one or more other vehicle control modules, may detect when one or more of the wheels has been replace by a skid, or when two or more wheels are connected by a track. When a skid is detected, the electric motor corresponding to the position of the skid may be deactivated, e.g., switched off When the skid or the track is detected, the motor controller system may automatically activate the differential steering or tank steer mode.

The systems and methods for differential steering address the various issues with single-steer-mode vehicles. In normal steer mode, the wheeled vehicle may be operated safely at high speeds. In situations or on terrain where tighter turning is necessary or beneficial, differential assist steering, differential steering or tank steer mode may be activated. In many embodiments, the steering mode is selected by the user, and transitions between modes occur when the vehicle is stopped, and the steering wheel is in a substantially neutral position. Transitioning between normal steering mode, differential assist steering mode, and differential steering or tank steer mode may be effortless for the operator by having the motor controller automatically switching modes based on various conditions. This may improve the safety of the vehicle and reduce the risk of damage to the vehicle by minimizing operator error.

Figure 1B:
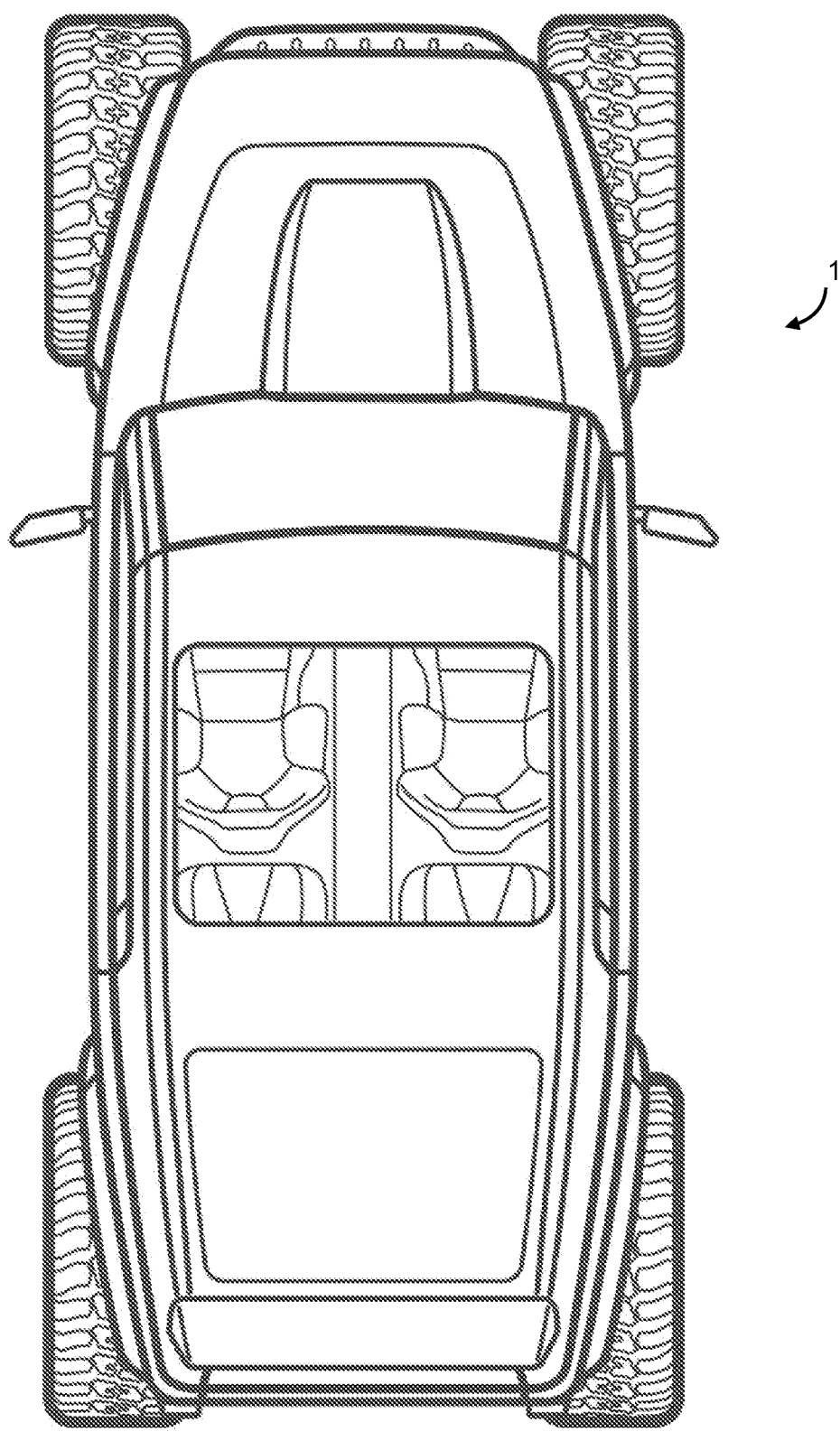
FIG. 1B illustrates a top view of the off-road wheeled vehicle equipped with a normal and differential steering system, according to an embodiment.
Figure 1C:
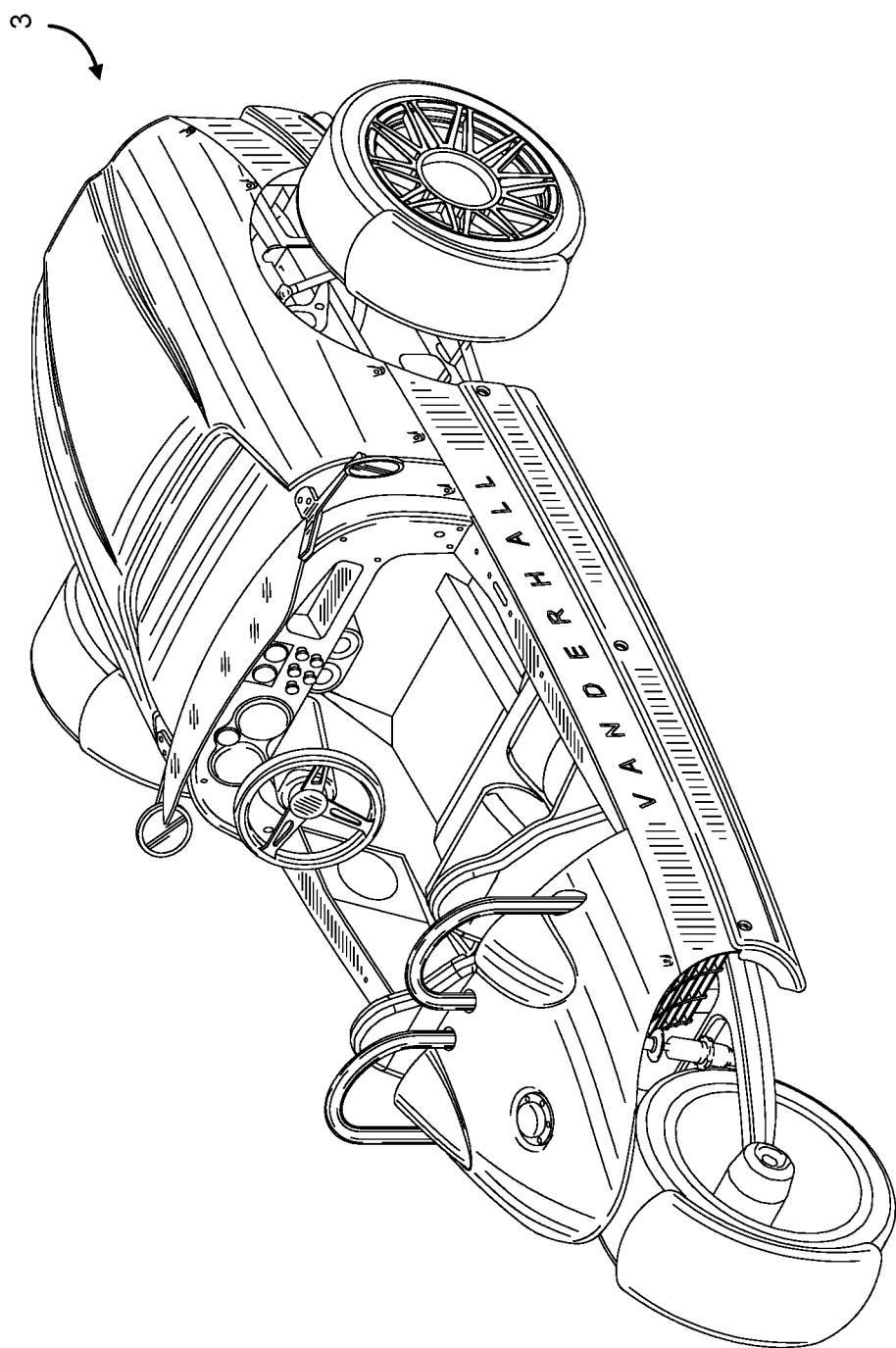
FIG. 1C illustrates an on-road wheeled vehicle equipped with a normal and differential steering system, according to an embodiment.
Figure 1D:
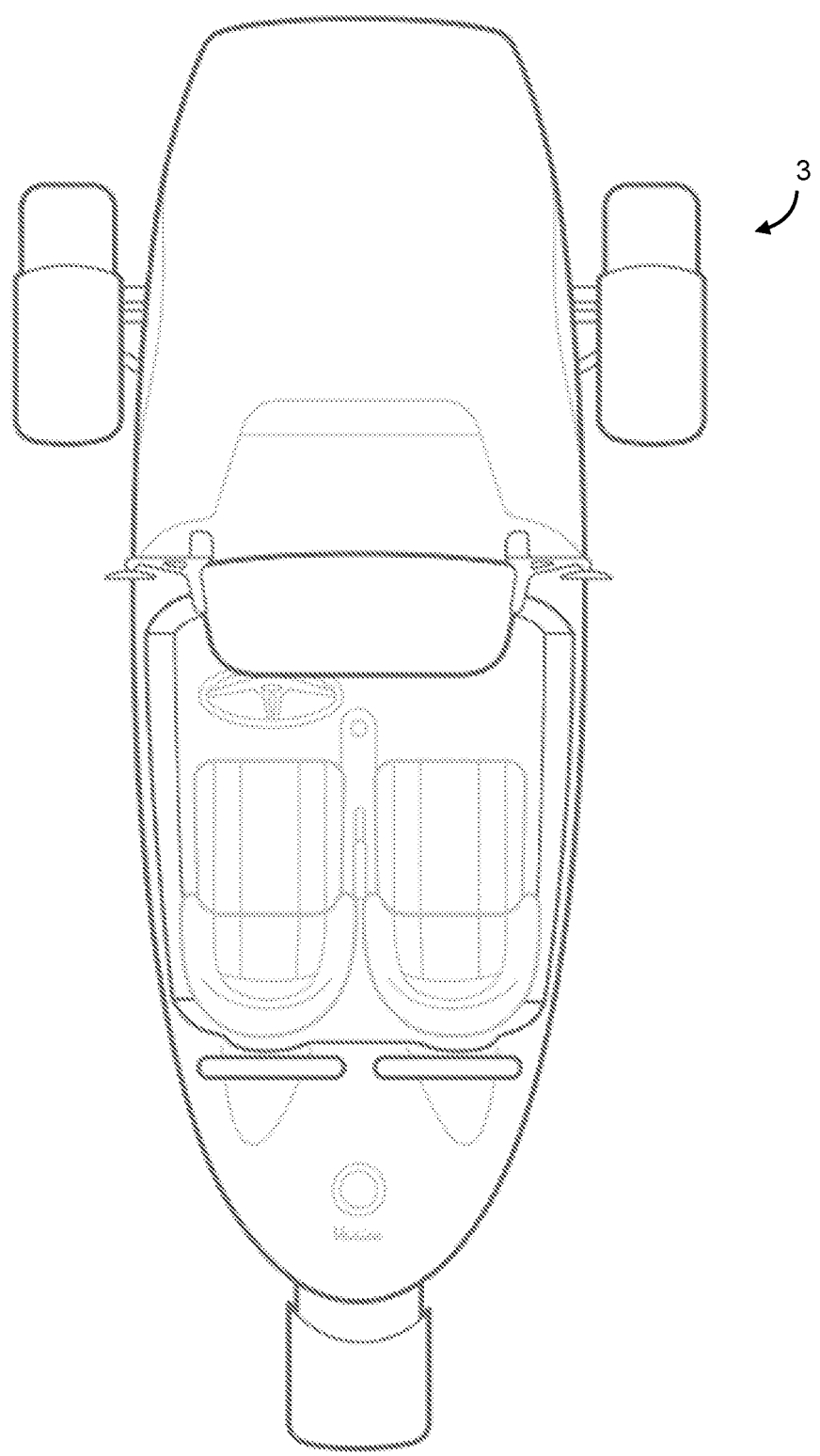
FIG. 1D illustrates a top view of the on-road wheeled vehicle equipped with a normal and differential steering system, according to an embodiment.

FIGS. 1A-D illustrate various wheeled vehicle configurations according to various embodiments. A wheeled vehicle with an integrated differential steering or tank steering system may be powered by an internal combustion engine, an electric motor, and/or a battery. The wheeled vehicle may have any of a variety of numbers of wheels, such as two, three, four, five, six, seven, eight, and so forth. Versions of the wheeled vehicle with an even number of wheels may have an equal number of wheels on both sides of the wheeled vehicle. FIGS. 1A and 1B depict a four-wheeled off-road vehicle 1. Versions of the wheeled vehicle with an odd number of wheels may have an equal number of wheels on both sides of the wheeled vehicle with the remaining wheel at the front end or the back end of the wheeled vehicle. FIGS. 1C and 1D depict a three-wheeled vehicle 3. In one example, the rear wheel may be coupled to the vehicle chassis by a swing arm, such as is described in U.S. Pat. No. 10,703,152 (incorporated herein in entirety by reference). The swing arm may couple to a wheel hub by a spindle, which may enable the rear wheel to pivot and/or turn.

Figure 2A:
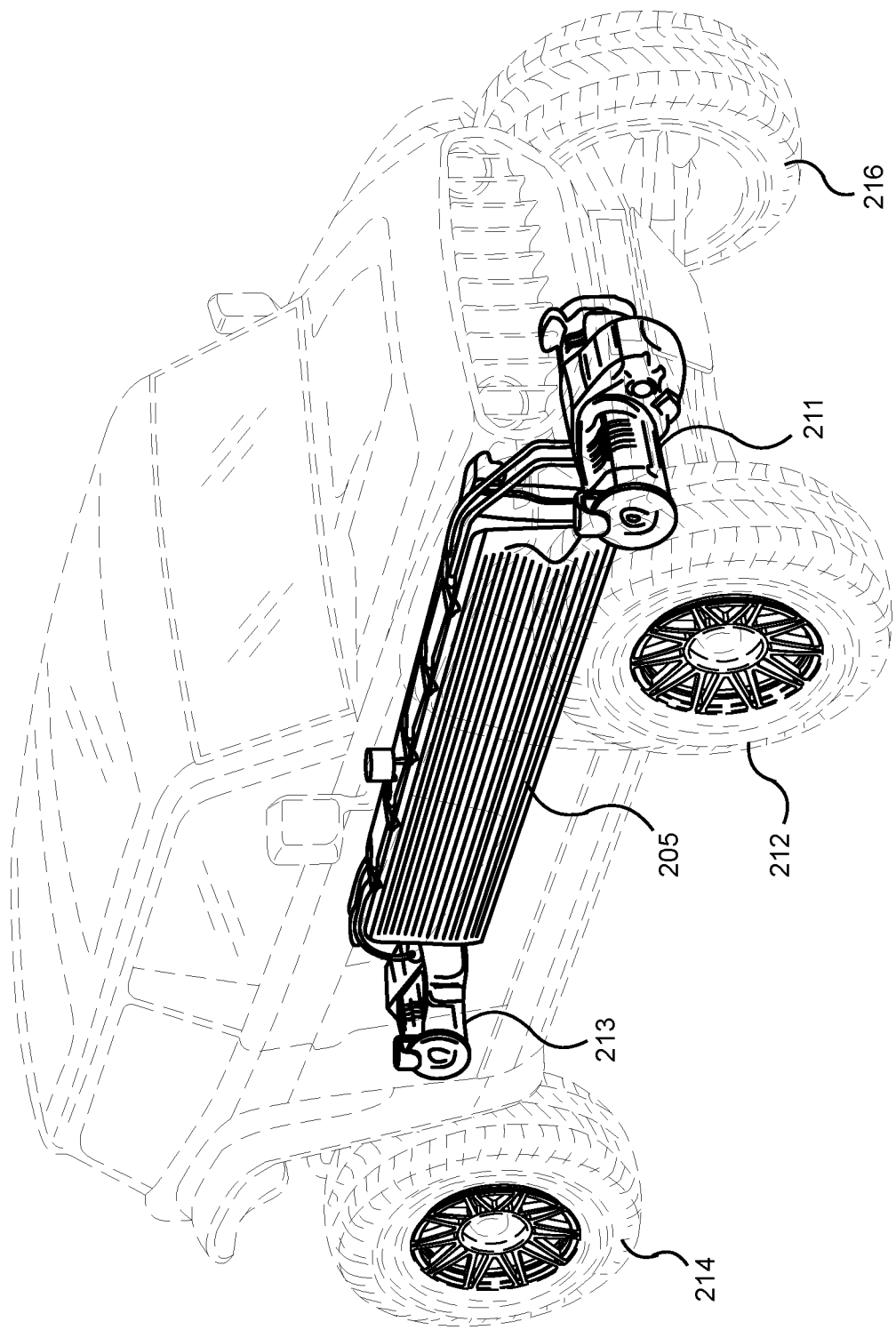
FIG. 2A illustrate an electric powertrain for a wheeled vehicle with a normal and differential steering system, according to an embodiment.
Figure 2B:
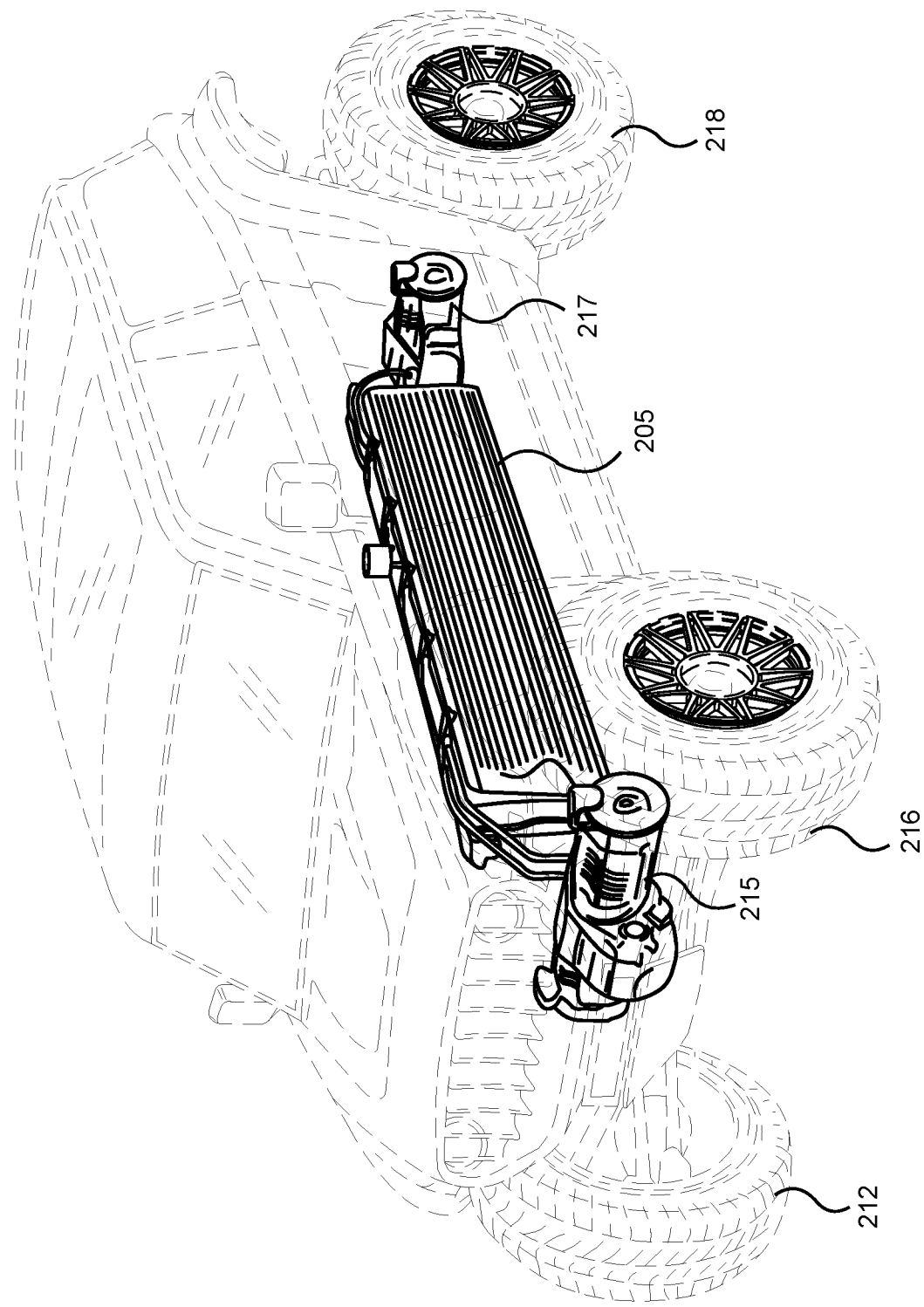
FIG. 2B illustrate an electric powertrain for a wheeled vehicle equipped with a normal and differential steering system, according to an embodiment.

FIGS. 2A and 2B illustrate an electric powertrain for a wheeled vehicle equipped with a differential steering or tank steer system. The electric powertrain may include one or more battery modules 205 and one or more electric motors powered by the battery modules. A battery module may include one or more battery cells, a battery management system, and/or a temperature regulation system. The wheels of the vehicle may be driven by one or more electric motors. An electric motor may drive two or more wheels using drivetrain components such as a transmission, drive shaft, transfer case, differential, axle, and so forth. In some embodiments, such as that depicted in FIGS. 2A and 2B, multiple wheels of the vehicle may each be driven by a corresponding motor. For example, motor 211 drives wheel 212, motor 213 drives wheel 214, motor 215 drives wheel 216, and motor 217 drives wheel 218. Motors 212 and 214 are on the passenger or right side of the vehicle along with wheels 213 and 215. Motors 215 and 217 are on the driver or left side of the vehicle along with wheels 216 and 218. For example, a three-wheeled vehicle may include three electric motors; a four-wheeled vehicle may include four electric motors; and so forth.

As another example, a four-wheeled vehicle with two driven wheels may include two electric motors corresponding, respectively, to each driven wheel. The non-driven wheels of the vehicle may be arranged and/or designed to rotate independently of each other and of the driven wheels. For example, each non-driven wheel may be independently coupled to a chassis of the vehicle, such as by independent suspension. The non-driven wheels may be coupled to the same axle and may rotate independently by a differential.

A wheeled vehicle may include two electric motors. A first electric motor may drive the wheels on a first side of the vehicle, e.g., the driver side of the vehicle. A second electric motor may drive the wheels on a second side of the vehicle, e.g., the passenger side of the vehicle. As a steering input is received when the vehicle is in a differential steering or tank steer mode, the first electric motor may rotate the wheels on the first side of the vehicle in a direction opposite the direction that the second motor rotates the wheels on the second side of the vehicle.

A wheeled vehicle with an odd number of wheels may include three electric motors. A first electric motor may drive the wheels on a first side of the vehicle, a second electric motor may drive wheels on the second side of the vehicle, and a third electric motor may drive an odd wheel, such as a wheel aligned with a centerline of the vehicle. The odd wheel may be a leading wheel or a trailing wheel. As a specific example, a three-wheeled vehicle may have two wheels at a front end of the vehicle and a single wheel at a back end of the vehicle. The single wheel may be rotatably attached to the vehicle by a spindle.

Figure 3A:
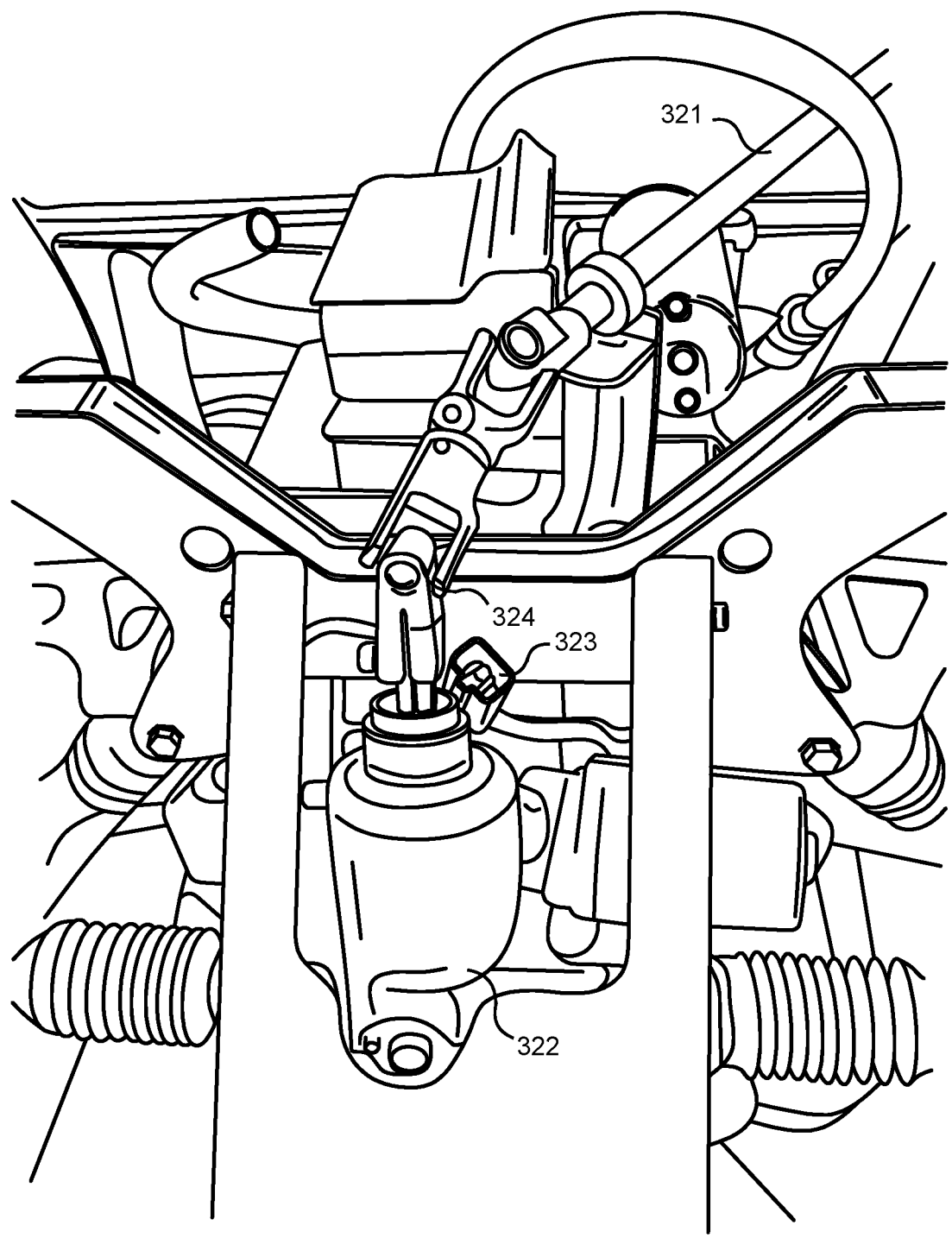
FIG. 3A illustrates an electric power steering system for a wheeled vehicle, according to an embodiment.
Figure 3B:
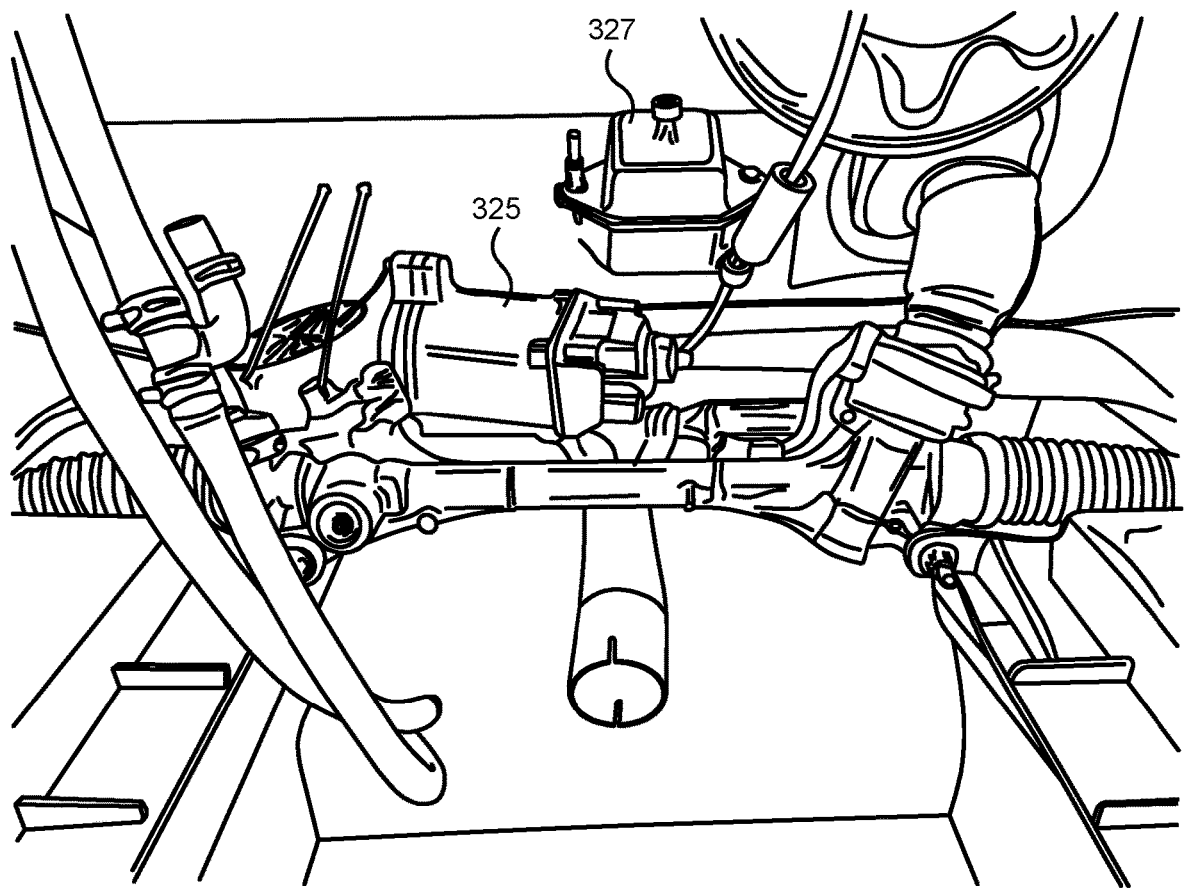
FIG. 3B illustrates an electric power steering system for a wheeled vehicle, according to an embodiment.

FIGS. 3A-B illustrate embodiments and arrangements of steering mechanisms, one example being an electric power steering assist system. An electric power steering assist system may include one or more universal joints such as u-joint 324, an input shaft, an output shaft, one or more intermediate shafts, an electric assist motor, a torque sensor, a servomechanism, a pinion, a rack, one or more tie rods, and so forth. A steering wheel of a wheeled vehicle may be connected to a steering shaft or steering column. The steering column or steering shaft 321 may be rotatably attached to a chassis of the vehicle. The steering column may be attached to an input shaft, such as a torsion bar, of the servomechanism 322. A torque sensor may be coupled to one or more of the steering column, the input shaft, and the servomechanism 322. The torque sensor may include a strain gauge 323. The strain gauge 323 may be coupled to one or more elements of the vehicle's steering system separately from the torque sensor. The motor controller 327 is electrically connected to the motors. An output shaft of the electric steering assist motor 325 may be engaged with a gear coupled to one or more of the input shaft and the servomechanism. The steering assist system includes an electric steering assist motor 325. The steering assist system helps turn the wheels in normal steering mode. In differential steering mode the steering assist system stops the wheels from turning or changing the angle of travel, effectively becoming a steering mechanism lock to lock the steered wheels in a fixed position. In some embodiments, the steering assist system locks the wheels when the wheels are parallel to a longitudinal axis of the vehicle. An output shaft, such as a steering shaft, may extend from the servomechanism to the rack and pinion. The tie rods may couple wheels of the vehicle to the steering system, such as via wheel hubs and/or spindles.

Figure 4A:
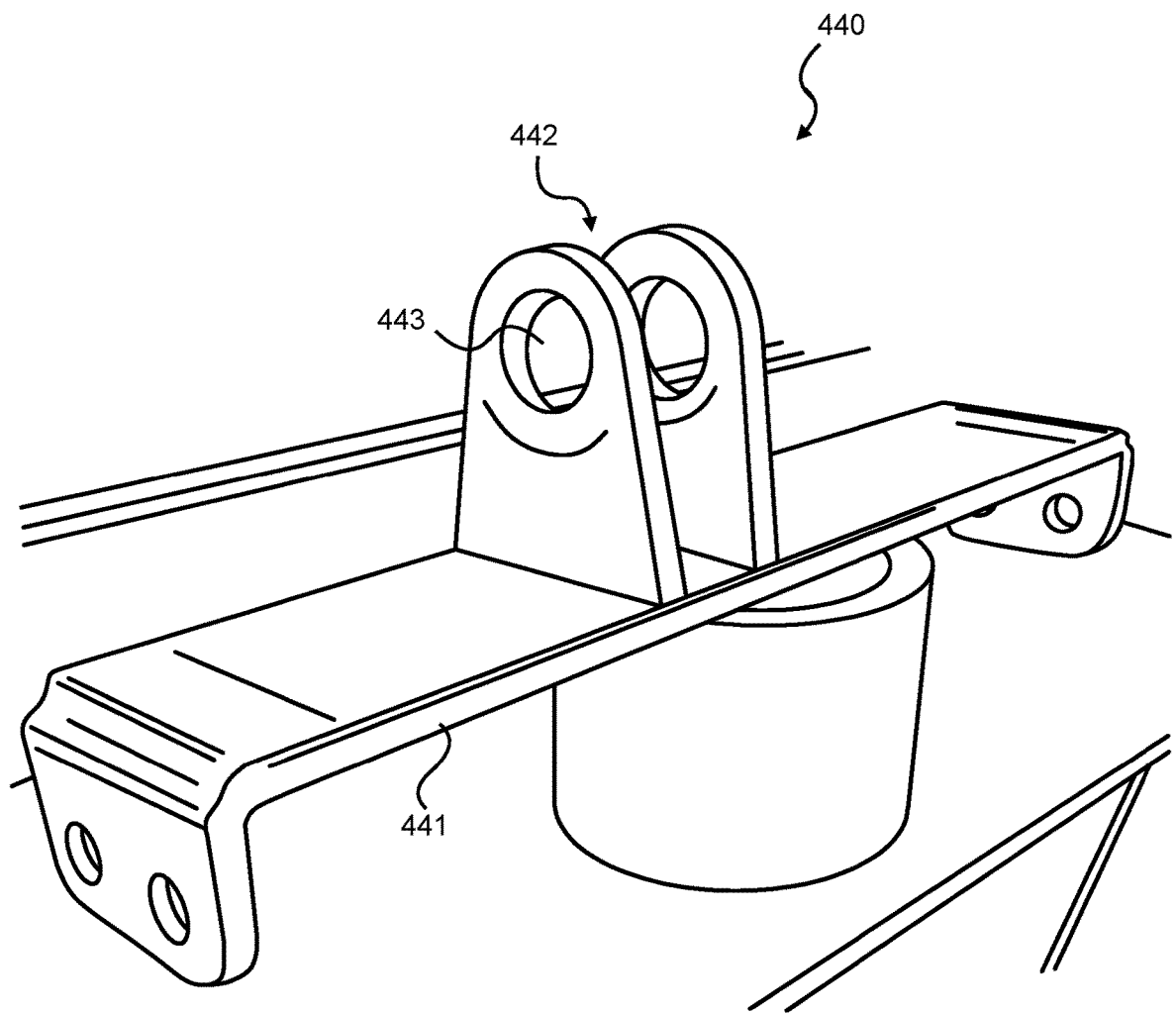
FIG. 4A illustrates a steering pin lock, according to an embodiment.

FIG. 4A illustrates a steering pin lock. The steering pin lock 440 may include a bracket 441 and a slot 442. The bracket 441 may couple the steering pin lock 440 to the vehicle chassis. The slot 441 may engage with a steering system component, such as a shaft or universal joint. A shape of the slot may be contoured to a shape of the steering system component to engage with and prevent rotation of the steering system component. The slot 442 may include one or more openings 442 in which a pin may be placed. The pin may secure the steering system component in the slot and/or may further prevent rotation of the steering system component. In another example, a shaft of the steering system may have at least a segment that is cube-shaped as opposed to rounded, with at least two flat sides. The flat sides may be opposite each other. The lock may engage with the flat sides and prevent rotation of the shaft.

Figure 4B:
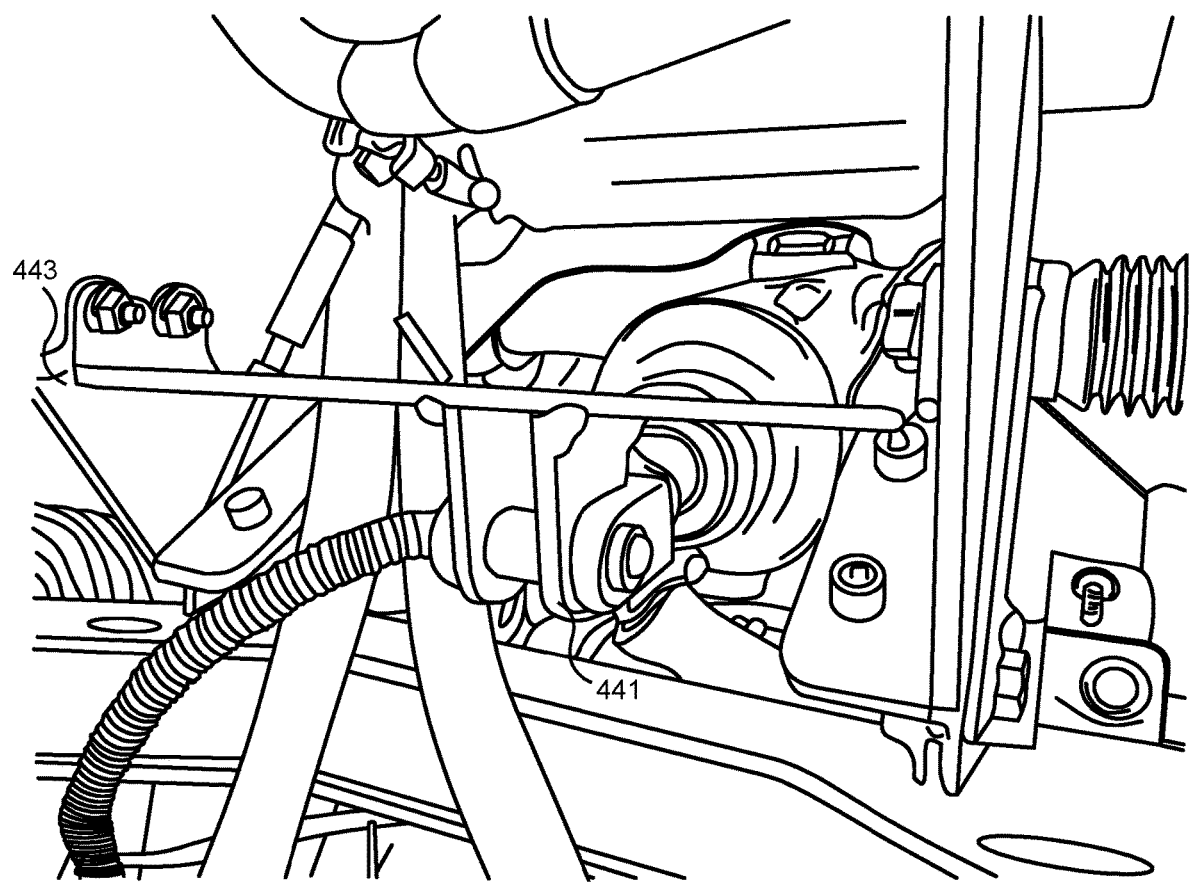
FIG. 4B illustrates the steering pin lock engaged with the input shaft of an electric power steering system, according to an embodiment.

FIG. 4B illustrates the steering pin lock 441 engaged with the input shaft of an electric power steering system. The pin lock is mounted to a chassis component 443 of the vehicle and engages with a joint that is attached to the input shaft. In various implementations of the differential steering or tank steer system described herein, the vehicle may be steered using a steer-by-wire system. An input received via a steering interface such as a steering wheel may be converted into one or more electronic signals. The signals may be communicated from the steering interface to an electric power steering system. The electric power steering system may execute one or more instructions based on the signals received from the steering interface, such as rotating an output shaft that outputs rotation to a rack and pinion system. The output shaft may be directly or indirectly coupled to the input shaft. As the steering pin lock is engages with the input shaft, the output shaft may be prevented from rotating.

In various implementations of the differential steering or tank steer system, instructions may be implemented by the motor controller to prevent the electric power assist motor from rotating the output shaft. For example, in a differential steering or tank steer mode of the vehicle, the electric power assist motor may be turned off, preventing steering interface signals from being translated into rotation of the output shaft by the power assist motor. The steering pin lock may engage with the input shaft and thereby prevent turning of the wheels due to terrain roughness, the motion of the vehicle, and so forth.

Figure 4C:
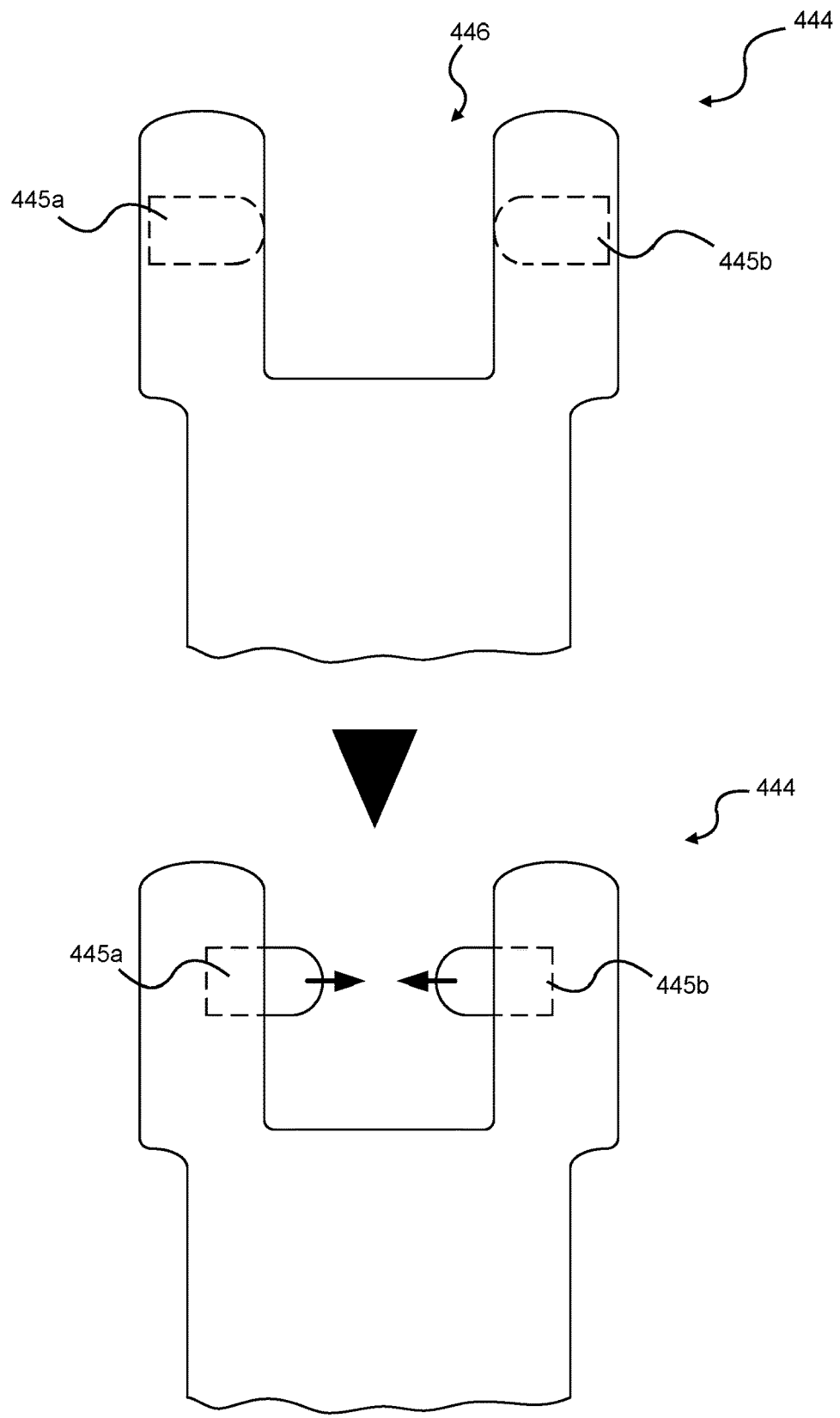
FIG. 4C illustrates an electric steering lock, according to an embodiment.

FIG. 4C illustrates an electric steering lock 444, according to an embodiment. The electric steering lock 444 may include one or more pins, such as pins 445a and 445b that extend into a slot 446. The pins 445a and 445b may be extendable into and retractable from the slot by one or more corresponding linear actuators.

Figure 4D:
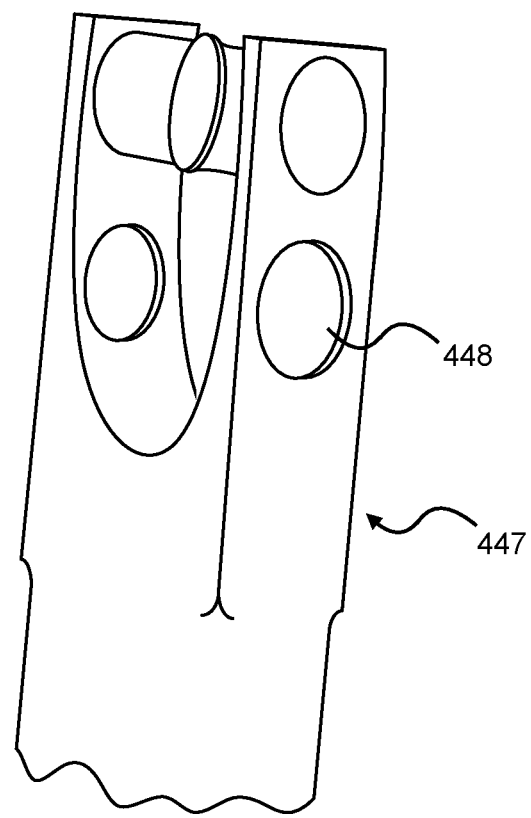
FIG. 4D illustrates a portion of a locking universal joint, according to an embodiment.

FIG. 4D illustrates a portion of a locking universal joint 447, according to an embodiment. The locking universal joint may include one or more openings, such as opening 448 through which a pin may be placed. The pin may secure the steering lock to the universal joint and/or may prevent rotation of the universal joint.

Figure 4E:
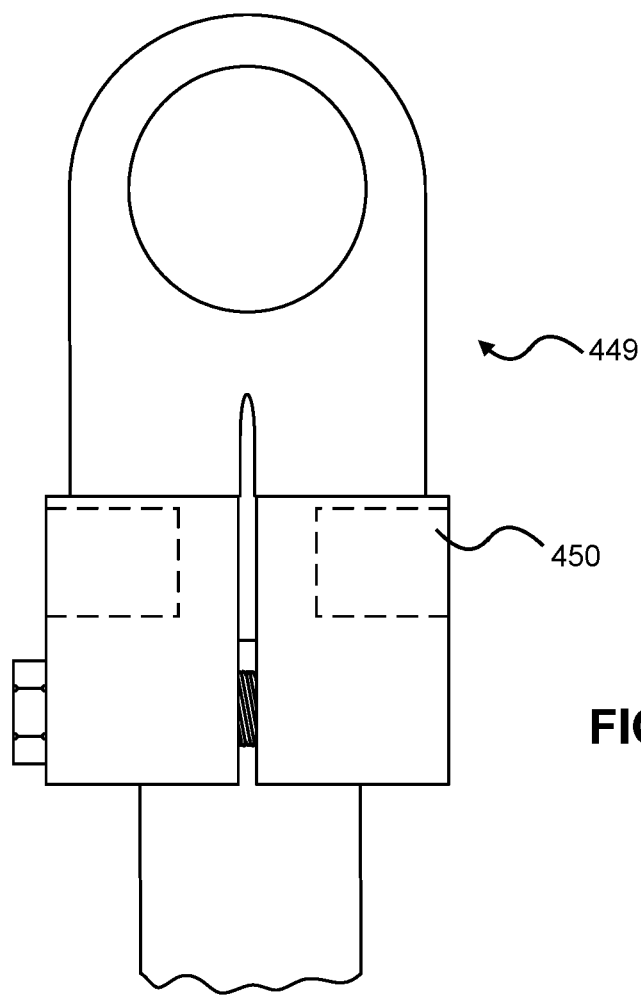
FIG. 4E illustrates a portion of a locking universal joint that attaches to an input shaft of a power steering assist system, according to an embodiment.

FIG. 4E illustrates a portion 449 of a locking universal joint that attaches to an input shaft of a power steering assist system, according to an embodiment. The locking universal joint may include one or more openings, such as opening 450 through which a pin may be placed to prevent the joint from rotating.

Figure 4F:
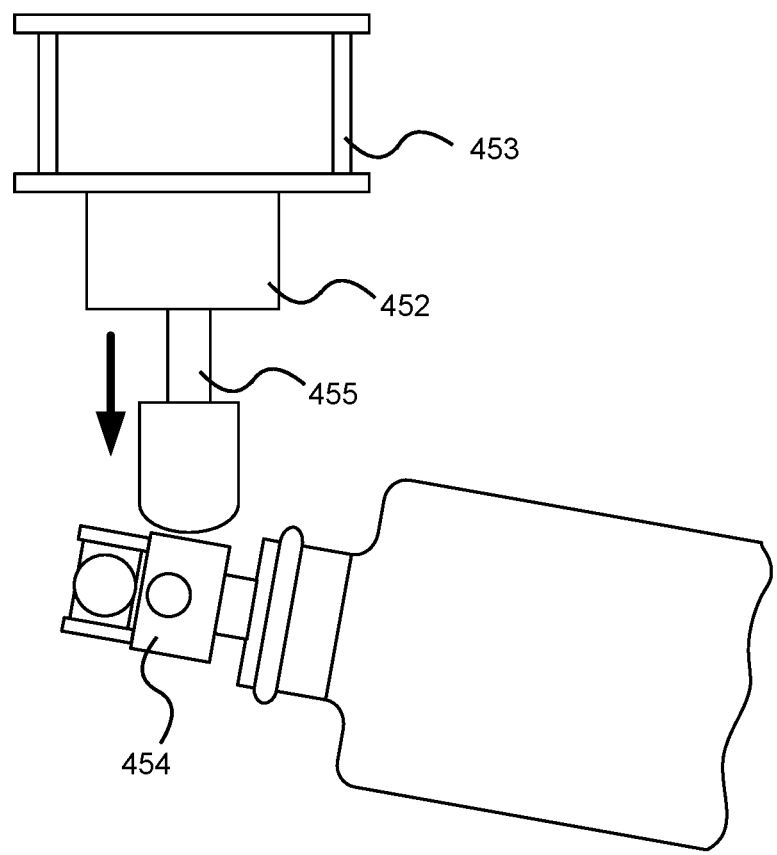
FIG. 4F illustrates an arrangement of a steering lock and power steering assist system, according to an embodiment.

FIG. 4F illustrates an arrangement of a steering lock and power steering assist system, according to an embodiment. The steering lock 452 may be attached to the vehicle chassis 453, such as to a crossmember of the chassis. The steering lock 452 may further be positioned adjacent to an element of the power steering assist system, such as a universal joint 454. The steering lock 452 may be extendable from the chassis, such as via an electric linear actuator, a hydraulic telescoping arm, and/or a manual telescoping arm 455. In an extended state, the steering lock may engage with and prevent rotation of the universal joint. In a retracted state, the steering lock may be disengaged from the universal joint.

In various embodiments of the differential steering or tank steer system, rotation of the steering shaft may be prevented electromagnetically using the power assist system. The servomechanism, torque sensor, and/or strain gauge may detect a steering input in a first direction. In a differential steering or tank steer mode, the power assist system may counter the steering input with a consummate torque applied, via the power assist motor rotor, to the gear coupled to the input shaft.

Figure 4G:
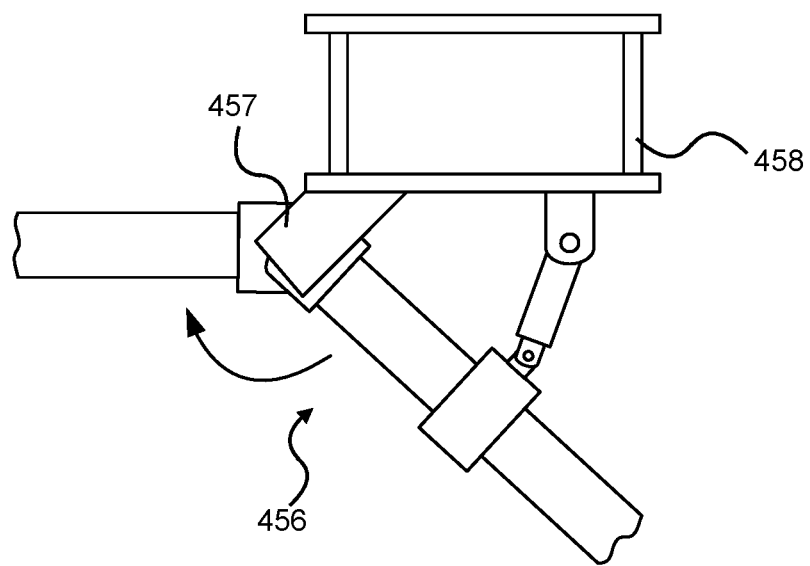
FIG. 4G illustrates another arrangement of a steering lock and power steering assist system, according to an embodiment.
Figure 4G:
Figure 4G:
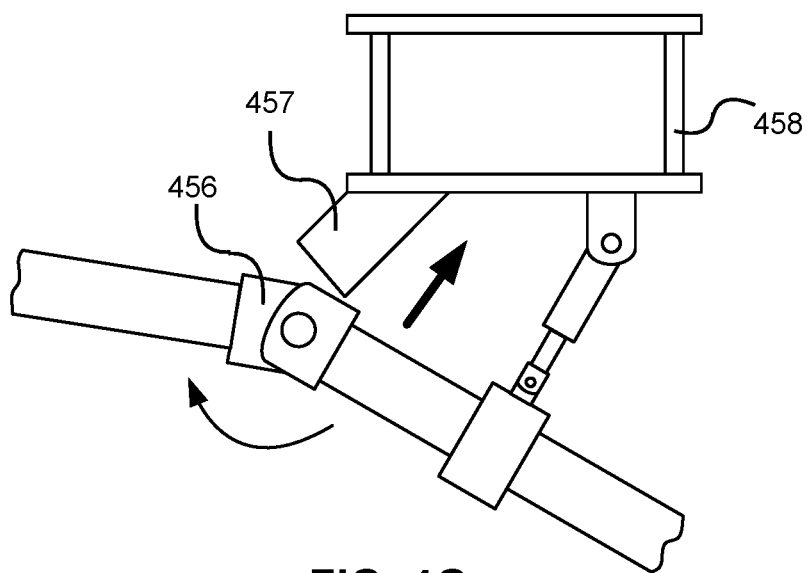

FIG. 4G illustrates another arrangement of a steering lock and power steering assist system. A universal joint 456 of the steering linkage may have a range of angles at which the universal joint is operable. Outside the range of angles, the universal joint may bind against itself A first steering shaft may be couple via a linear actuator to a chassis component of the vehicle. The angle of the universal joint may be adjusted by changing a length of the linear actuator. In a first position of the linear actuator, the universal joint may be within an operable angle such that up to 360 degrees of rotation may be translated across the universal joint. In a second position of the linear actuator, the universal joint may be outside the operable angle. At least a portion of the universal joint may be positioned within a seat 457. The seat 457 may be secured to a component 458 of the vehicle chassis and may have a shape that is contoured to a shape of the universal joint. The seat may further prevent rotation of the steering shafts and/or the universal joint.

Figure 4H:
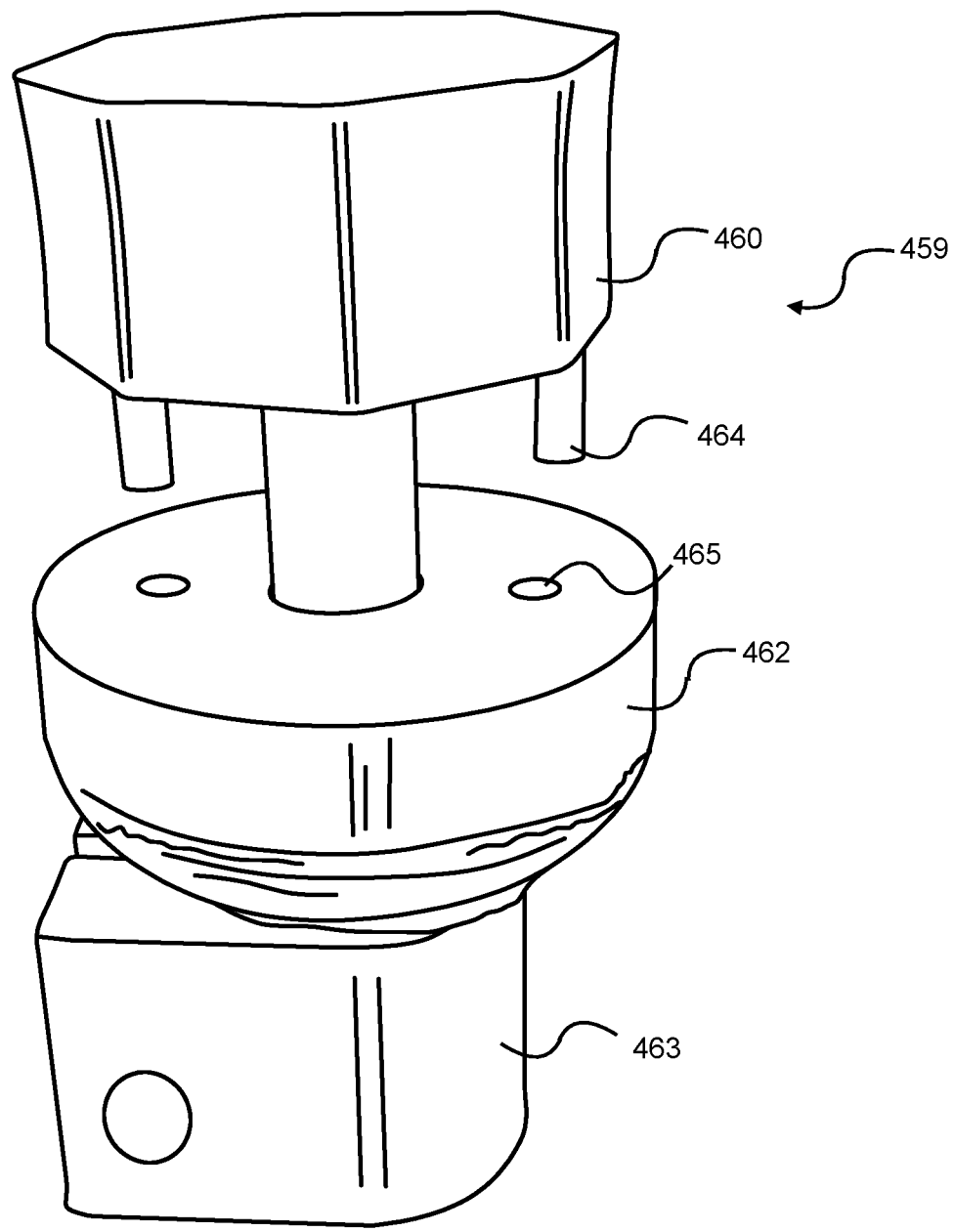
FIG. 4H illustrates a sliding steering lock, according to an embodiment.

FIG. 4H illustrates a sliding steering lock 459. A first side 460 of the sliding steering lock may be coupled to a first steering shaft 461. A second side 462 of the sliding steering lock may be coupled to a second steering shaft 463. At least one of the first or second steering shafts may be an input or output shaft of an electric power steering assist system. The first side 460 of the sliding steering lock may include one or more pins, such as pin 464 extending towards the second side of the sliding steering lock. The second side of the sliding steering lock may include one or more openings, such as opening 465 that correspond to the pins extending from the first side of the sliding steering lock. At least one of the pins and one of the openings may be offset from the other pins and openings to ensure that a rotational position of the first side aligns with a rotational position of the second side. This may enable alignment of a steering interface, such as a steering wheel, with a steering position of the wheels and/or power steering assist system.

When the pins of the first side are disengaged from the openings in the second side, the first side may rotate freely, preventing a steering input from the steering interface from being communicated mechanically to the wheels. When the pins are positioned in the openings, steering inputs may be mechanically communicated to the wheels. The first and second sides of the sliding steering lock may be engaged and/or disengaged by a mechanism such as a spring, a pneumatic actuator, a linear actuator, and so forth.

Figure 5:
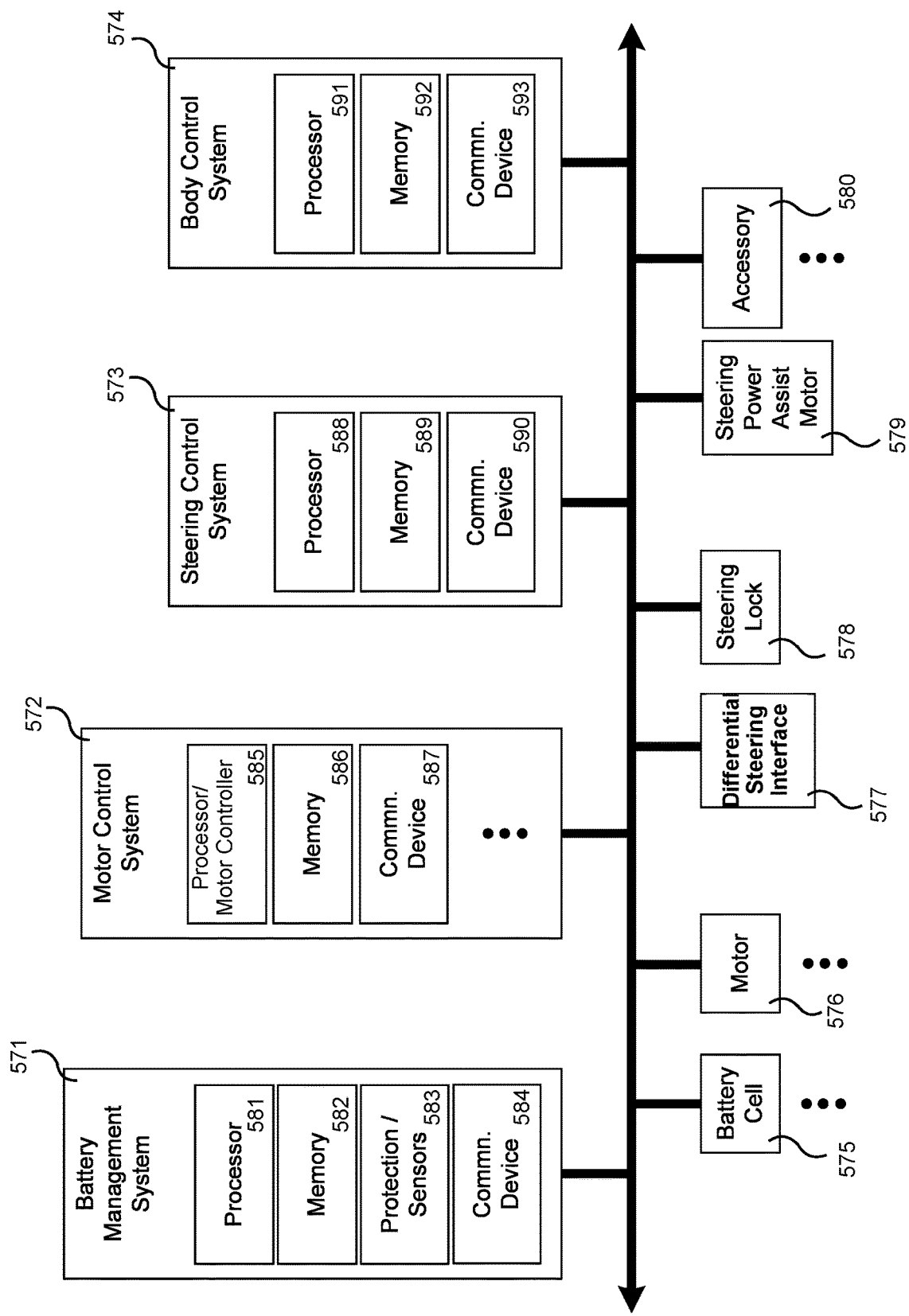
FIG. 5 illustrates a vehicle control system with an integrated differential steering or tank steer system, according to an embodiment.

FIG. 5 illustrates a vehicle control system with an integrated differential steering or tank steer system, according to an embodiment. The vehicle control system may include a battery management system 571, a motor control system 572, a steering control system 573, a body control system 574, one or more battery cells 575, one or more electric motors 576 that drive the vehicle wheels, a tank steer interface 577, a steering lock 578, a steering power assist motor 579, and/or one or more accessories 580. Elements of the vehicle control system may be integrated with the vehicle or may be separate from the vehicle, such as on a mobile phone, tablet computer, personal computer, cloud server, and so forth. Various elements of the vehicle control system may communicate over a local area network such as a CANBUS. The elements may generally be networked using one or more communication links.

The battery management system further includes a processor 581, memory 582, various sensors, 583, and a communication device 584. The motor control system 572 further includes a processor 585 also known as a motor controller, memory 586, and a communication device 587. The steering control system 573 includes a processor 588, memory, and a communication device. The body control system includes a processor 591, memory 592, and a communication device.

The communication links may be direct or indirect. A direct link may include a link between two devices where information is communicated from one device to the other without passing through an intermediary. For example, the direct link may include a Bluetooth™ connection, a Zigbee® connection, a Wifi Direct™ connection, a near-field communications (NFC) connection, an infrared connection, a wired universal serial bus (USB) connection, an ethernet cable connection, a fiber-optic connection, a firewire connection, a microwire connection, and so forth. In another example, the direct link may include a cable on a bus network. "Direct," when used regarding the communication links, may refer to any of the aforementioned direct communication links.

An indirect link may include a link between two or more devices where data may pass through an intermediary, such as a router, before being received by an intended recipient of the data. For example, the indirect link may include a wireless fidelity (WiFi) connection where data is passed through a WiFi router, a cellular network connection where data is passed through a cellular network router, a wired network connection where devices are interconnected through hubs and/or routers, and so forth. The cellular network connection may be implemented according to one or more cellular network standards, including the global system for mobile communications (GSM) standard, a code division multiple access (CDMA) standard such as the universal mobile telecommunications standard, an orthogonal frequency division multiple access (OFDMA) standard such as the long-term evolution (LTE) standard, and so forth. "Indirect," when used regarding the communication links, may refer to any of the aforementioned indirect communication links.

Various of the vehicle control system elements may include a communication device, a memory device, and/or a processing device. Various of the communication, processing, and memory devices may be electronically connected by a system bus and/or on a common printed circuit board. The system bus may be and/or include a control bus, a data bus, an address bus, and so forth.

A processing device of the vehicle control system may handle inputs and/or generate outputs. The processing device may cause data to be written and stored in the corresponding memory device based on the inputs. The processing device may retrieve data stored in the memory device, perform various computations based on instructions stored in the memory device, and output data and/or instructions to another element of the vehicle control system via the communication device. The processing device may determine, based on instructions and/or data stored in the memory device, what data and/or signals to output. For example, the processing device for the steering control system may receive a signal corresponding to a steering input. The processing device may determine a steering mode of the vehicle and may output one or more signals to a motor controller based on the steering input.

Though depicted separately, one or more of the control subsystems in the vehicle control system may be integrated together. For example, the steering control system and the motor control system may be integrated as a single system, utilizing the same processing device, memory device, and communication device. In some implementations, the steering control system may be integrated partly with the motor control system and partly with the body control system. The body control system may control and/or communicate with the differential steering or tank steer interface and may transmit data to the motor control system based on inputs received via the differential or tank steer interface. The motor control system may adjust an amount or direction of current to one or more of the motors based on the data received from the body control system.

One or more elements of the vehicle control system may be integrated into a device external to the vehicle, such as a smartphone, a personal computer, an external application server, and/or an external database. For example, instructions for receiving and communicating an input to activate or change a steering mode of the vehicle may be stored on a smartphone. The instructions may include displaying a graphical user interface on the smartphone. A user may input information via the graphical user interface, which may be communicated from the smartphone to a control unit integrated with the vehicle.

A processing device of the vehicle control system may have volatile and/or persistent memory. A memory device of the vehicle control system may have volatile and/or persistent memory. The processing device may have volatile memory and the memory device may have persistent memory. The processing device may generate an output based on an input. For example, the processing device may receive an electronic and/or digital signal. The processing device may read the signal and perform one or more tasks with the signal, such as performing various functions with data in response to input received by the processing device. The processing device may read from the memory device information needed to perform the functions. The processing device may send an output signal to the memory device, and the memory device may store data according to the signal output by the processing device.

The processing device may be and/or include a processor, a microprocessor, a computer processing unit (CPU), a graphics processing unit (GPU), a neural processing unit, a physics processing unit, a digital signal processor, an image signal processor, a synergistic processing element, a field-programmable gate array (FPGA), a sound chip, a multi-core processor, and so forth. As used herein, "processor," "processing component," "processing device," and/or "processing unit" may be used generically to refer to any or all of the aforementioned specific devices, elements, and/or features of the processing device.

The memory device may be and/or include a computer processing unit register, a cache memory, a magnetic disk, an optical disk, a solid-state drive, and so forth. The memory device may be configured with random access memory (RAM), read-only memory (ROM), static RAM, dynamic RAM, masked ROM, programmable ROM, erasable and programmable ROM, electrically erasable and programmable ROM, and so forth. As used herein, "memory," "memory component," "memory device," and/or "memory unit" may be used generically to refer to any or all of the aforementioned specific devices, elements, and/or features of the memory device.

Various elements of the vehicle control system may include data communication capabilities. Such capabilities may be rendered by various electronics for transmitting and/or receiving electronic and/or electromagnetic signals. The communication device may include, for example, a networking chip, one or more antennas, and/or one or more communication ports. The communication device may generate radio frequency (RF) signals and transmit the RF signals via one or more of the antennas. The communication device may receive and/or translate the RF signals. The communication device may transceive the RF signals. The RF signals may be broadcast and/or received by the antennas.

The communication device may generate electronic signals and transmit the RF signals via one or more of the communication ports. The communication device may receive the RF signals from one or more of the communication ports. The electronic signals may be transmitted to and/or from a communication hardline by the communication ports. The communication device may generate optical signals and transmit the optical signals to one or more of the communication ports. The communication device may receive the optical signals and/or may generate one or more digital signals based on the optical signals. The optical signals may be transmitted to and/or received from a communication hardline by the communication port, and/or the optical signals may be transmitted and/or received across open space by the networking device.

The communication device may include hardware and/or software for generating and communicating signals over a direct and/or indirect network communication link. For example, the communication component may include a USB port and a USB wire, and/or an RF antenna with Bluetooth™ programming installed on a processor, such as the processing component, coupled to the antenna. In another example, the communication component may include an RF antenna and programming installed on a processor, such as the processing device, for communicating over a Wifi and/or cellular network. As used herein, "communication device" "communication component," and/or "communication unit" may be used generically herein to refer to any or all of the aforementioned elements and/or features of the communication component.

Various elements of the control system may be referred to as a "server." Such elements may include a server device. The server device may include a physical server and/or a virtual server. For example, the server device may include one or more bare-metal servers. The bare metal servers may be single-tenant servers or multiple tenant servers. In another example, the server device may include a bare metal server partitioned into two or more virtual servers. The virtual servers may include separate operating systems and/or applications from each other. In yet another example, the server device may include a virtual server distributed on a cluster of networked physical servers. The virtual servers may include an operating system and/or one or more applications installed on the virtual server and distributed across the cluster of networked physical servers. In yet another example, the server device may include more than one virtual server distributed across a cluster of networked physical servers.

The term server may refer to functionality of a device and/or an application operating on a device. For example, an application server may be programming instantiated in an operating system installed on a memory device and run by a processing device. The application server may include instructions for receiving, retrieving, storing, outputting, and/or processing data. A processing server may be programming instantiated in an operating system that receives data, applies rules to data, makes inferences about the data, and so forth. Servers referred to separately herein, such as an application server, a processing server, a collaboration server, a scheduling server, and so forth may be instantiated in the same operating system and/or on the same server device. Separate servers may be instantiated in the same application or in different applications.

Various aspects of the systems described herein may be referred to as "data." Data may be used to refer generically to modes of storing and/or conveying information. Accordingly, data may refer to textual entries in a table of a database. Data may refer to alphanumeric characters stored in a database. Data may refer to machine-readable code. Data may refer to images. Data may refer to audio. Data may refer to, more broadly, a sequence of one or more symbols. The symbols may be binary. Data may refer to a machine state that is computer readable. Data may refer to human-readable text.

Various elements of the vehicle control system may include a user interface for outputting information in a format perceptible by a user and receiving input from the user. The user interface may include a display screen such as a light-emitting diode (LED) display, an organic LED (OLED) display, an active-matrix OLED (AMOLED) display, a liquid crystal display (LCD), a thin-film transistor (TFT) LCD, a plasma display, a quantum dot (QLED) display, and so forth. The user interface may include an acoustic element such as a speaker, a microphone, and so forth. The user interface may include a button, a switch, a keyboard, a touch sensitive surface, a touchscreen, a camera, a fingerprint scanner, and so forth. The touchscreen may include a resistive touchscreen, a capacitive touchscreen, and so forth.

Various methods are described herein. The methods may be implemented by the vehicle control system and/or various elements of the vehicle control system. For example, inputs indicated as being received in a method may be input via a user interface. Determinations made in the methods may be outputs generated by a processing device and based on the inputs and/or instructions stored in the memory device.

Figure 6:
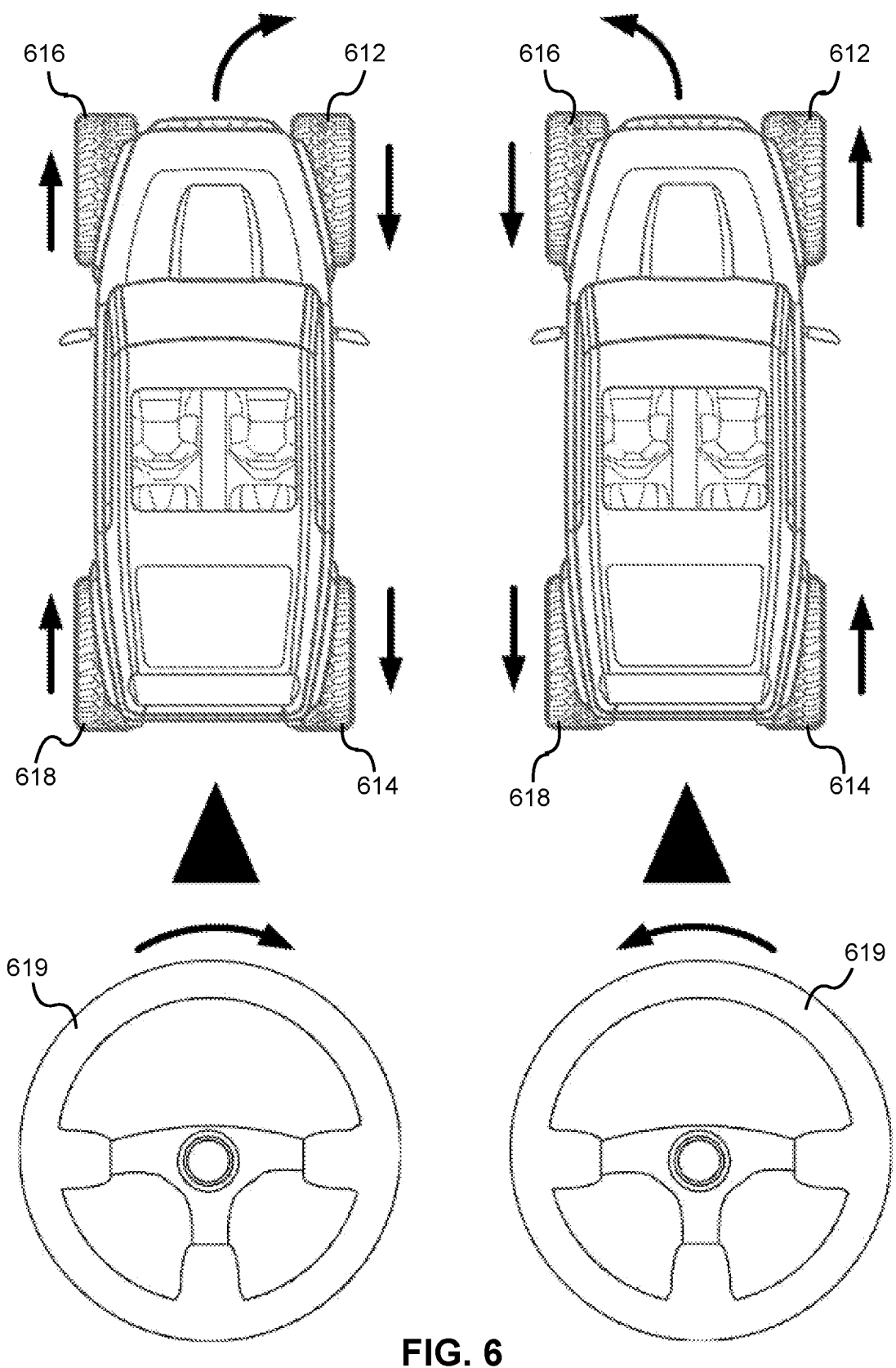
FIG. 6 illustrates steering inputs and corresponding wheel speed adjustments of a four-wheeled vehicle in a differential steering or tank steer mode.

FIG. 6 illustrates steering inputs and corresponding wheel speed adjustments of a four-wheeled vehicle in a differential steering or tank steer mode. A clockwise steering input may correspond to an increase in a rotational speed of wheels on the left side of the vehicle (where "left" and "right," as used herein, are from the perspective of a passenger in the vehicle facing the front of the vehicle). The clockwise steering input may correspond to a decrease in a rotational speed of wheels on the right side of the vehicle. The left-side wheels may increase forward rotation and the right-side wheels may increase reverse rotation. Similarly, A counterclockwise steering input may correspond to a decrease or reversal of a speed of wheels on the left side of the vehicle and an increase in a forward speed of wheels on the right side of the vehicle.

In some embodiments, such as that depicted in FIG. 6, the steering input is a steering wheel. When the steering mode chosen is differential steering or tank steer and the steering wheel 619 is rotated in the clockwise direction the wheels 616 and 618 on the left or driver side of the vehicle will rotate in the forward direction, and the wheels 612 and 614 on the passenger or right side of the vehicle will rotate in the reverse direction. Pivoting the vehicle in the clockwise direction. When the steering wheel 619 is rotated in the counterclockwise direction, the wheels on the diver or left side of the vehicle 616 and 618 will rotate in a reverse direction, and the wheels 612 and 614 on the passenger or right side of the vehicle will rotate in the forward direction, pivoting the vehicle in the counterclockwise direction.

The change in wheel speed for wheels on either side of the vehicle may correspond to the direction and/or state of travel of the vehicle. For example, the body control system may determine, via a wheel speed sensor, that the vehicle is at rest when the steering input is received. In response to determining the vehicle is at rest and the steering input is clockwise, the left-side motors may rotate the left-side wheels forward, and the right-side motors may rotate the wheels in reverse. These instructions may be stored on and/or executed by the motor controllers, which may directly control the amount and/or direction of current flowing to the motors. As another example, the body control system may determine that the vehicle is traveling forward. The rotational speed of the left-side wheels may be increased, and the rotational speed of the right-side wheels may be decreased. In yet another example, the vehicle may be traveling in reverse. In response to a counterclockwise steering input, the rotational speed of the left-side wheels may be decreased, and the rotational speed of the right-side wheels may be increased, albeit both sides in the reverse direction.

The amount of change in the rotational speeds of the wheels may be based on a current speed of the vehicle and/or a magnitude of the steering input. The amount of change in the rotational speeds of the wheels may be directly proportional to the magnitude of the steering input. The amount of change in the rotational speeds of the wheels may be exponentially proportional to the magnitude of the steering input. The change in rotational speed may be discontinuously proportional to the magnitude of the steering input.

Figure 7:
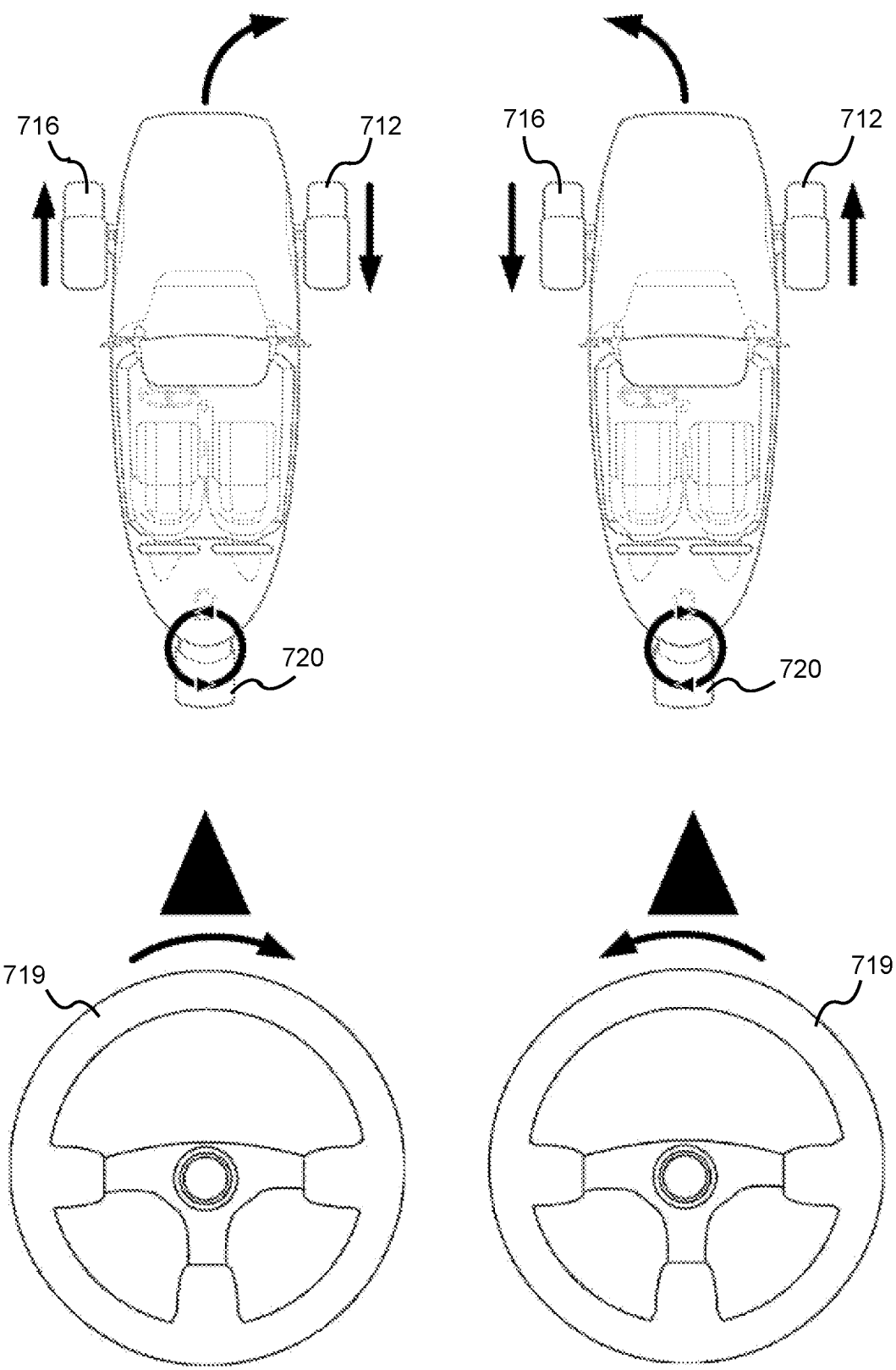
FIG. 7 illustrates steering inputs and corresponding wheel speed adjustments of a three wheeled vehicle in a differential steering or tank steer mode.

FIG. 7 illustrates steering inputs and corresponding wheel speed adjustments of a three-wheeled vehicle in a differential steering or tank steer mode. The front wheels of the vehicle may behave similarly to the behavior described above regarding FIG. 6. The rear wheel of the vehicle may be pivotable. The rear wheel may be freely pivotable. The rear wheel may be coupled by a tie rod and spindle to an electronic steering system. The rear wheel may be steerable in response to steering inputs via the vehicle's steering interface. For example, a clockwise steering input may be received by a steering controller. The steering controller may output a signal to the electronic steering system for the rear wheel, which may, in response, steer the rear wheel counterclockwise (from the top-down perspective. As another example, the body control system may detect the vehicle is traveling in reverse. A clockwise steering input may, in such an example, correspond to a counterclockwise rotation of the rear wheel, an increase in the reverse speed of the front left wheel, and a decrease in the reverse speed of the front right wheel.

In some embodiments, such as that depicted in FIG. 7, the steering input is a steering wheel. When the steering mode chosen is differential steering or tank steer and steering wheel 719 is rotated in the clockwise direction the wheel 716 on the left or driver side of the vehicle will rotate in the forward direction, and the wheel 712 on the passenger or right side of the vehicle will rotate in the reverse direction. Pivoting the vehicle in the clockwise direction. When the steering wheel 719 is rotated in the counterclockwise direction, the wheel 716 on the diver or left side of the vehicle will rotate in a reverse direction, and the wheel 712 on the passenger or right side of the vehicle will rotate in the forward direction, pivoting the vehicle in the counterclockwise direction. In some embodiments, the rear third wheel is fixed in place. In embodiments, such as that depicted in FIG. 7 the rear third wheel 720 is rotatable and rotates to facilitate pivoting the vehicle.

Figure 8:
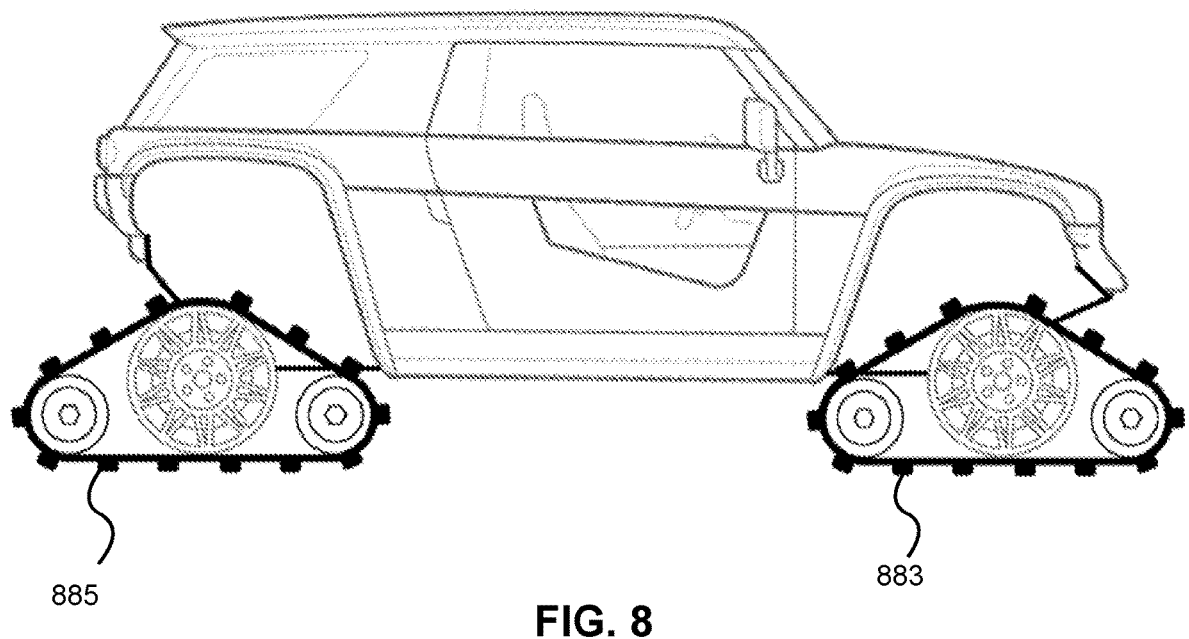
FIG. 8 illustrates an off-road wheeled vehicle in track configuration, according to various embodiments.

FIG. 8 illustrates an off-road wheeled vehicle in a track configuration. The wheeled vehicle may be convertible from a wheeled configuration to the tracked configuration. There are different track options available for converting to a tracked vehicle. In some embodiments, such as depicted in FIG. 8, each of the four wheels is replaced by a track assembly. For example, track assembly 873 would replace the front passenger tire, and track assembly 875 would replace the rear passenger tire. The driver side tires would also be replaced.

Figure 9:
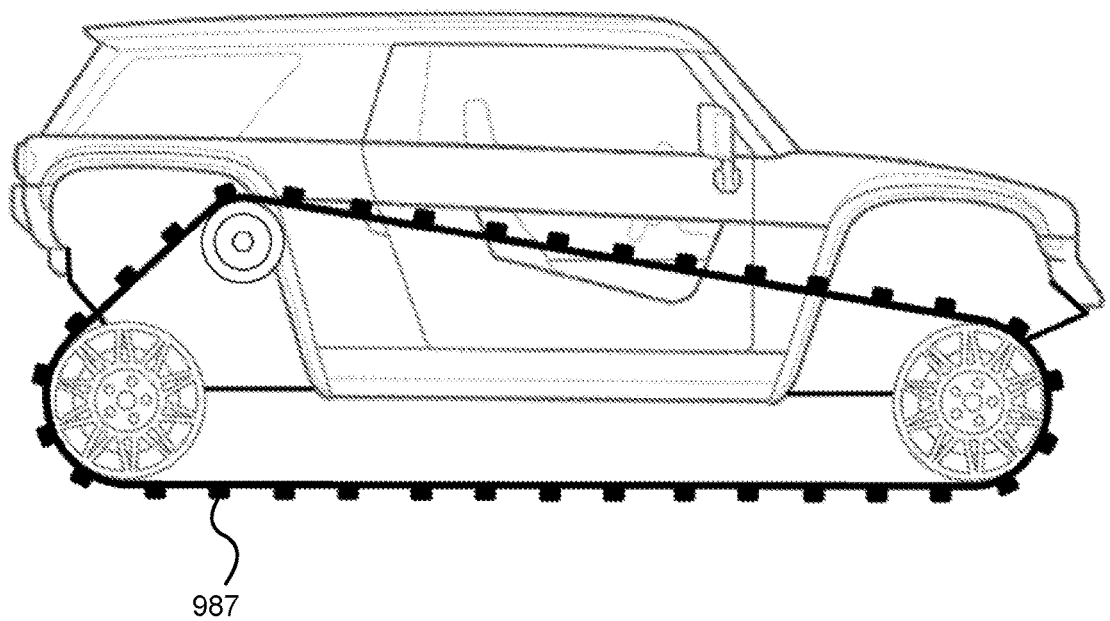
FIG. 9 illustrate an off-road wheeled vehicle in track configuration, according to various embodiments.

FIG. 9 illustrate an off-road wheeled vehicle in a track configuration. The wheeled vehicle may be convertible from a wheeled configuration to the tracked configuration. In this embodiment, the track assembly 977 replaces both wheels on the passenger side, and spans substantially the whole length of the vehicle. The vehicle control system may automatically detect when the vehicle is in the track configuration. For example, the vehicle chassis may include attachment points for track components such as pulleys, suspension for track components, and so forth. The body control system may include one or more sensors that detect when track components are attached to the vehicle. The controller for the body control system may store and/or execute instructions to engage the steering lock and set the motor controllers to tank steer mode in response to one or more of the track component sensors being activated, triggered, etc.

Figure 10A:
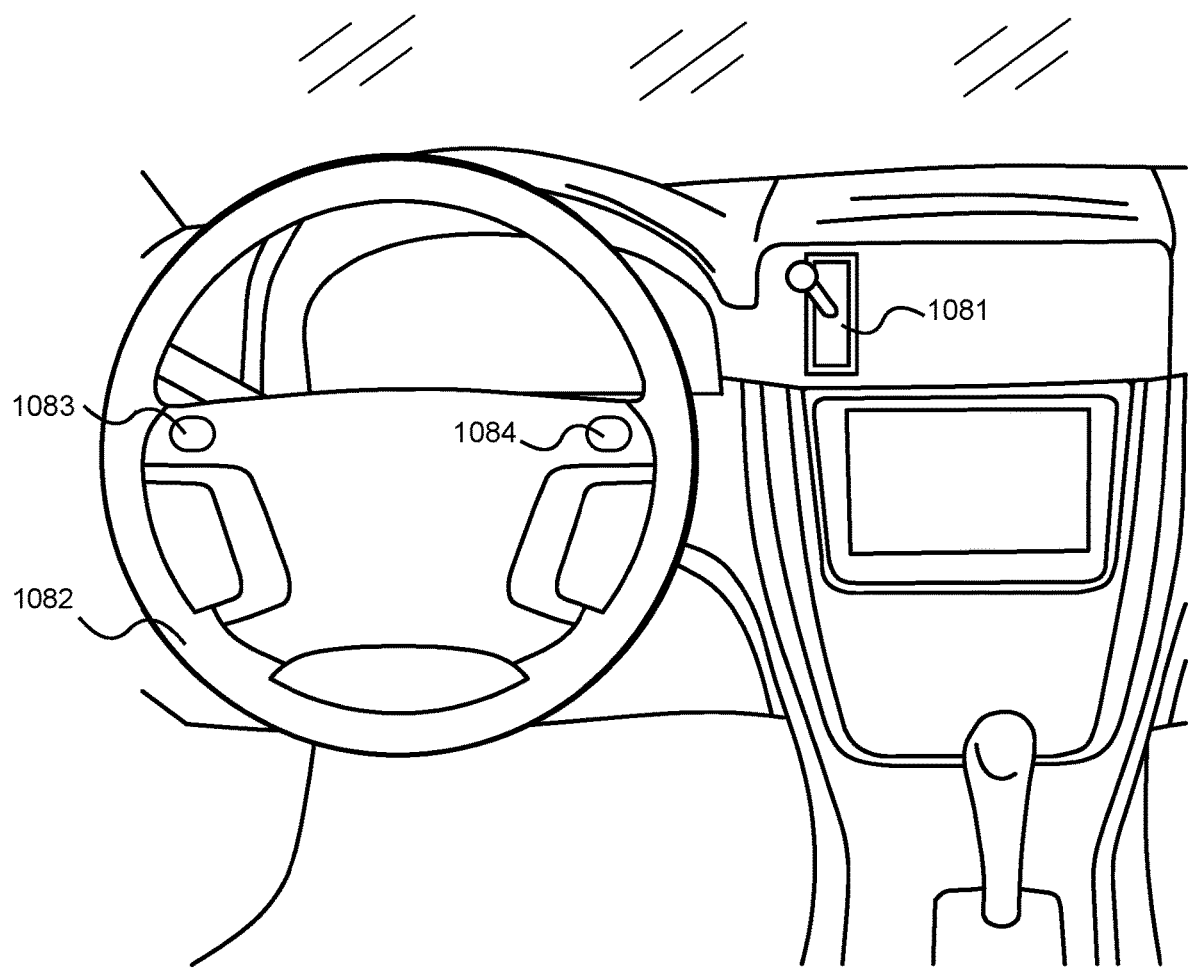
FIG. 10A illustrates a steering mode selection system and differential steering system, according to an embodiment.

FIG. 10A depicts an embodiment, of the vehicle where the mode selection system is a lever 1081, and the differential steering interface includes steering wheel 1082, and switches 1083 and 1084 on the steering wheel. The mode selection system enables the user to select the steering mode. The steering modes are normal steering mode, differential assist steering mode, differential steering mode, and tank mode. In normal steering mode the vehicle turns by changing the angle of travel of the steerable wheels. In differential assist mode, the user can use switches 1083 and 1084 to augment the turning ability of the steerable wheels. For example, the steering wheel is turned in the clockwise direction, and the user pushes switch 1083 on the left side of the steering wheel, causing the wheels on the left side of the vehicle to increase their speed, this sharpens the turn angle of the turn. In some embodiments, the switches are binary in the differential assist mode, that is there are two states, off or no assist or on and assist. And when pressed on, the amount of increase in the rotational speed is controlled by the motor controller. In other embodiments, the switches enable the user to control the amount of increase in the rotational speed of the wheels, by continuous pressing or by multiple pressings of the switch. In some embodiments, to move the lever 1081 of the mode selection system and change to differential steering mode, the vehicle must be stopped, and the steering wheel must be in a substantially neutral position. This is so that the wheels will lock and be oriented parallel to the longitudinal axis of the vehicle. Once differential driving mode has been selected, the steering wheel 1082 is used to turn the vehicle. In some embodiments, a user selects the switches on the steering wheel to turn the vehicle, while in differential steering mode. In embodiments when the switches are selected. the switches 1083 and 1084 are used to turn the vehicle. In some embodiments, the switches are binary in the differential steering mode, that is there are two states, off or on. When the switch is pressed the wheel will rotate at a predetermined speed. In other embodiments, the switches control the magnitude of the input. By pushing the switch at the top of the switch, or the up direction, the wheels rotate forward, and each press of the switch increases the speed of the rotation. Pushing the lower portion of the switch decreases the speed of the rotation of the wheels and when the wheels are not rotating, pushing the lower portion of the switch, or the down direction, will cause the wheels to rotate in the reverse direction.

Figure 10B:
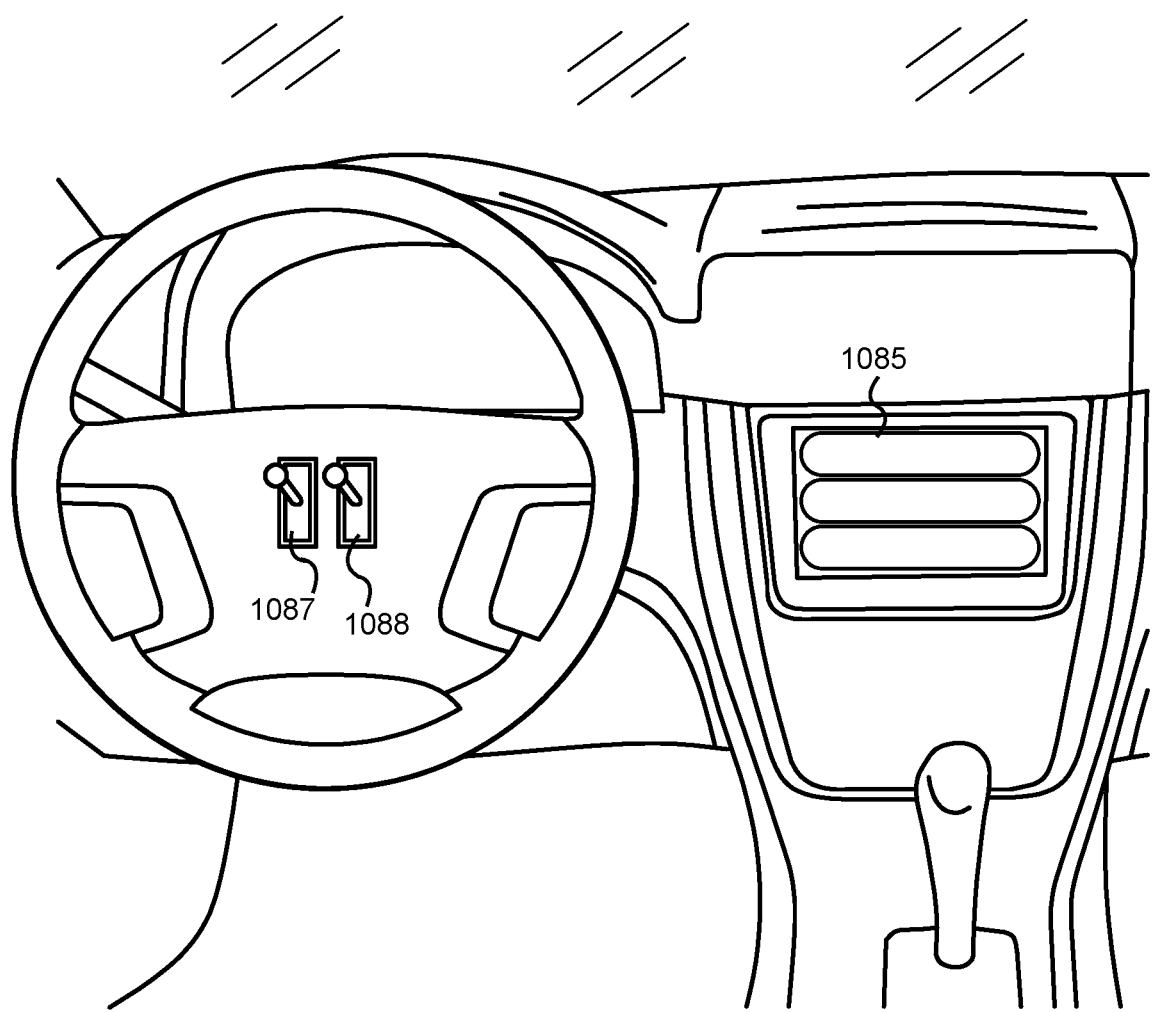
FIG. 10B illustrates a steering mode selection system and differential steering system, according to an embodiment.

FIG. 10B depicts an embodiment, of the vehicle where the mode selection system is a menu on a touch screen, or a graphical user interface 1085, and the differential steering interface includes levers 1087 and 1088 on the steering wheel. The mode selection system enables the user to select the driving mode. The driving modes are normal steering mode, differential assist steering mode, differential steering mode, and tank mode. In normal steering mode the vehicle turns by changing the angle of travel of the steerable wheels. In differential assist mode, the user can use levers 1087 and 1088 to augment the turning ability of the steerable wheels. For example, the steering wheel is turned in the clockwise direction, and the user pushes lever 1087 on the left side of the steering wheel up, causing the wheels on the left side of the vehicle to increase their speed, this sharpens the turn angle of the turn. In some embodiments, the levers enable the user to control the amount of increase in the rotational speed of the wheels, by pressing up in differing amounts. In some embodiments, to change to differential steering mode from the mode selection menu on the touch screen, the vehicle must be stopped, and the steering wheel must be in a substantially neutral position. This is so that the wheels will lock and be oriented parallel to the longitudinal axis of the vehicle. Once differential driving mode has been selected, the steering wheel is used to turn the vehicle. In some embodiments, the levers are used to turn the vehicle. By pushing the lever in the up direction, the wheels rotate forward, and the farther the lever is pressed the greater the increase in the speed of the rotation. Pushing the lever down decreases the speed of the rotation of the wheels and when the wheels are not rotating, pushing the lever in the down direction, will cause the wheels to rotate in the reverse direction.

Figure 10C:
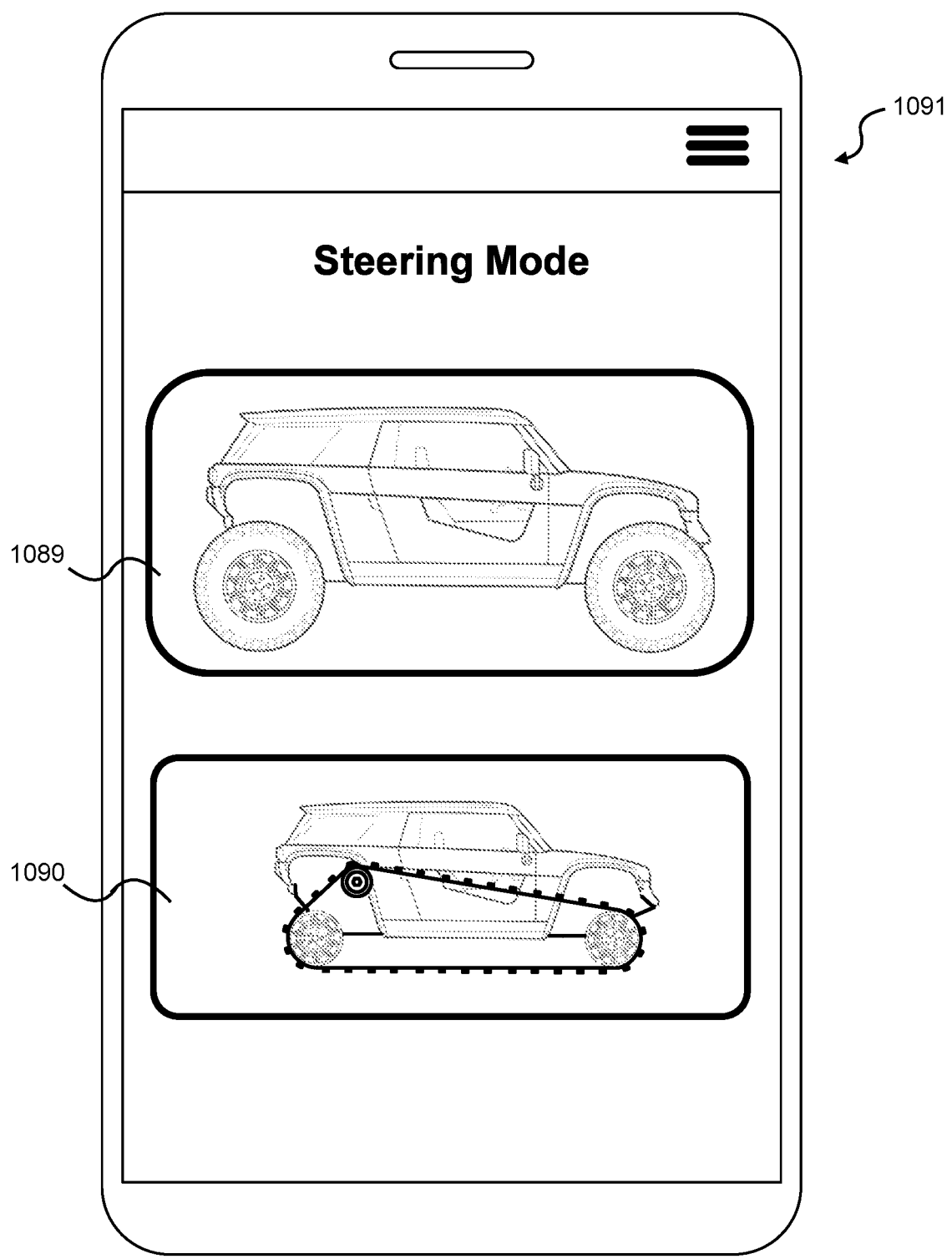
FIG. 10C illustrates a steering mode selection system.

FIG. 10C illustrates an example a steering mode selection system. The steering mode selection system may include a graphical user interface of an application running on a smartphone 1091. The steering mode selection system includes at least two steering modes in the graphical user interface normal steering mode 1089 and differential or tank steering mode 1090. The application and/or the smartphone may include instructions to receive a steering mode selection via the interface and communicate the selection to one or more controllers in the vehicle control system. The smartphone may communicate wirelessly with the vehicle control system, such as via Bluetooth, Wi-Fi, or cellular communications. In some examples, the smartphone and/or the vehicle control system may communicate the current steering mode to a cloud-based server, which may store the information and make it available to a user according to an authentication and/or authorization procedure stored on and executed by the server.

Figure 11:
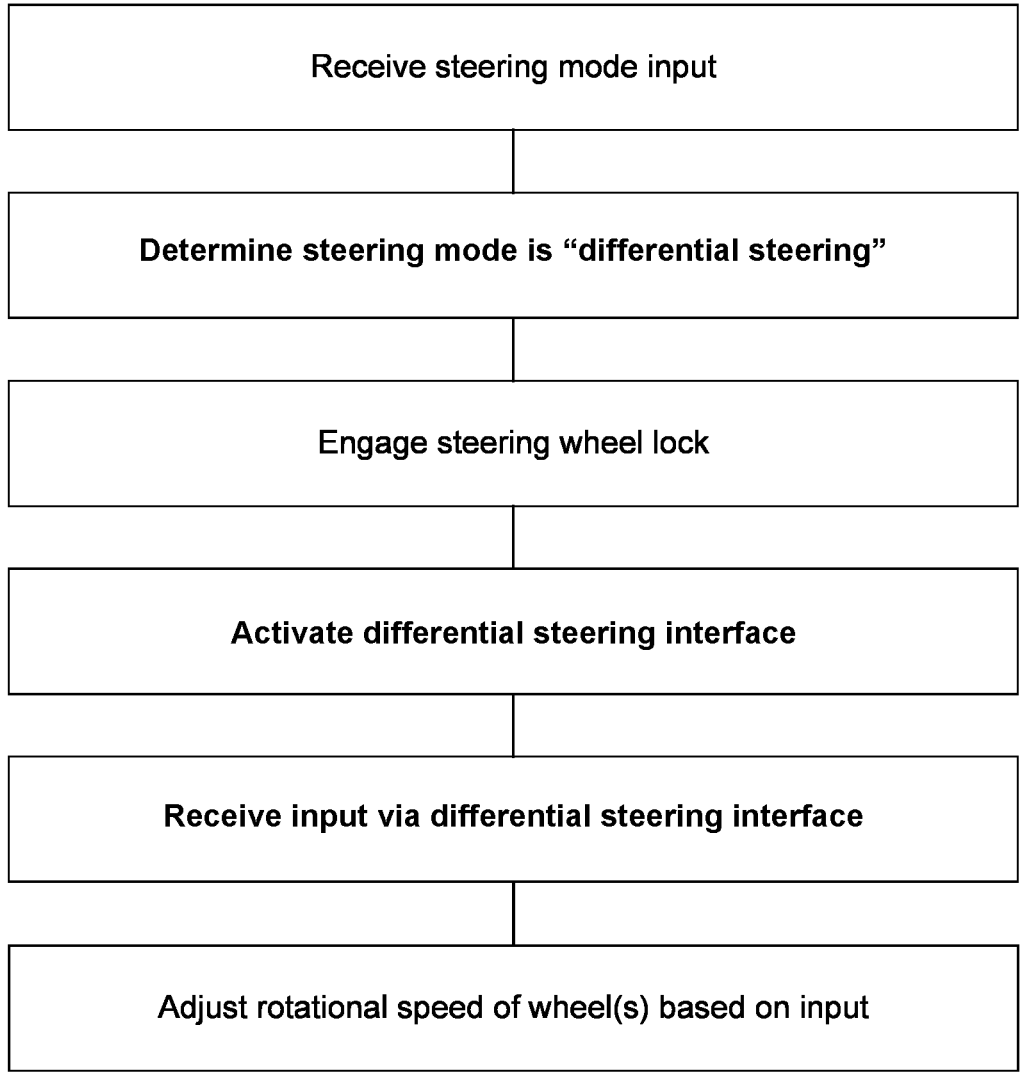
FIG. 11 illustrates a method of differential steering or tank-steering a wheeled vehicle, according to an embodiment.

FIG. 11 illustrates an example method of differential steering or tank-steering a wheeled vehicle. The method may include receiving a steering mode input. The steering mode input may be received via a user interface such as a button, toggle switch, or touchscreen graphical display. The method may include determining the input indicates to set the steering mode of the vehicle to a "differential steering" or "tank steer" mode. The method may include engaging a steering lock of the vehicle with a component of the steering system. The method may include activating a differential steering or tank steer interface. The method may include receiving an input via the differential steering or tank steer interface. The method may include adjusting a rotation speed of one or more wheels of the vehicle based on the input received via the differential steering or tank steer interface.

The method may further include adjusting the rotational speed of one or more wheels of the vehicle based on the input and/or another measurement made by an element of the vehicle control system. For example, the vehicle may include an inertial measurement unit. The method may include determining an angular rate of rotation of the vehicle based on a signal output by the inertial measurement unit. The method may include rotating one or more of the wheels to counter or enhance the angular rate of rotation of the vehicle. The method may include adjusting the rotational speed of one or more wheels of the vehicle in response to receiving a steering input in a regular steering mode of the vehicle. For example, an amount of torque to an outside wheel in a turn may be increased and an amount of torque to an inside wheel in a turn may be decreased proportionally so that each wheel maintains static frictional engagement with a ground surface during a turn.

The method may include switching a motor of a wheel that is to be slowed into a regeneration mode instead of, or in addition to, applying a brake to the wheel. The regeneration mode may cause the rotation of the wheel to slow as the wheel's rotational energy is converted to electric current that recharges a battery of the vehicle.

Most of the embodiments discussed above, when in a normal steering mode, only the two front wheels are used for steering. That is, the angle of direction of only the two front wheels is changed to effect steering. However, in other embodiments, all four wheels can be used for normal steering. That is, in order to make a right turn, the angle of the front two wheels is turned to the right, while the angle of the rear two wheels is turned to the left. Such vehicles can be used to make tighter turns. Also, such vehicles, where the front pair of wheels and the rear pair of wheels can be steered, can also be used in a "crab steering" mode. In such a mode, the angles of both pairs of wheels are turned in the same direction and the vehicle moves in that direction, without rotating the longitudinal axis of the vehicle. It is noted that in these other embodiments, it is preferred to lock out the normal steering mechanism for both pairs of wheels before entering the differential steering mode.

A feature illustrated in one of the figures may be the same as or similar to a feature illustrated in another of the figures. Similarly, a feature described in connection with one of the figures may be the same as or similar to a feature described in connection with another of the figures. The same or similar features may be noted by the same or similar reference characters unless expressly described otherwise. Additionally, the description of a particular figure may refer to a feature not shown in the particular figure. The feature may be illustrated in and/or further described in connection with another figure.

Elements of processes (i.e., methods) described herein may be executed in one or more ways such as by a human, by a processing device, by mechanisms operating automatically or under human control, and so forth. Additionally, although various elements of a process may be depicted in the figures in a particular order, the elements of the process may be performed in one or more different orders without departing from the substance and spirit of the disclosure herein.

The foregoing description sets forth numerous specific details such as examples of specific systems, components, methods and so forth, in order to provide a good understanding of several implementations. It will be apparent to one skilled in the art, however, that at least some implementations may be practiced without these specific details. In other instances, well-known components or methods are not described in detail or are presented in simple block diagram format in order to avoid unnecessarily obscuring the present implementations. Thus, the specific details set forth above are merely exemplary. Particular implementations may vary from these exemplary details and still be contemplated to be within the scope of the present implementations.

Related elements in the examples and/or embodiments described herein may be identical, similar, or dissimilar in different examples. For the sake of brevity and clarity, related elements may not be redundantly explained. Instead, the use of a same, similar, and/or related element names and/or reference characters may cue the reader that an element with a given name and/or associated reference character may be similar to another related element with the same, similar, and/or related element name and/or reference character in an example explained elsewhere herein. Elements specific to a given example may be described regarding that particular example. A person having ordinary skill in the art will understand that a given element need not be the same and/or similar to the specific portrayal of a related element in any given figure or example in order to share features of the related element.

It is to be understood that the foregoing description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements.

As used herein "same" means sharing all features and "similar" means sharing a substantial number of features or sharing materially important features even if a substantial number of features are not shared. As used herein "may" should be interpreted in a permissive sense and should not be interpreted in an indefinite sense. Additionally, use of "is" regarding examples, elements, and/or features should be interpreted to be definite only regarding a specific example and should not be interpreted as definite regarding every example. Furthermore, references to "the disclosure" and/or "this disclosure" refer to the entirety of the writings of this document and the entirety of the accompanying illustrations, which extends to all the writings of each subsection of this document, including the Title, Background, Brief description of the Drawings, Detailed Description, Claims, Abstract, and any other document and/or resource incorporated herein by reference.

As used herein regarding a list, "and" forms a group inclusive of all the listed elements. For example, an example described as including A, B, C, and is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively inclusive elements does not preclude other examples that include various combinations of some or all of the alternatively inclusive elements. An example described using a list of alternatively inclusive elements includes at least one element of the listed elements. However, an example described using a list of alternatively inclusive elements does not preclude another example that includes all of the listed elements. And an example described using a list of alternatively inclusive elements does not preclude another example that includes a combination of some of the listed elements. As used herein regarding a list, "and/or" forms a list of elements inclusive alone or in any combination. For example, an example described as including A, B, C, and/or D is an example that may include A alone; A and B; A, B and C; A, B, C, and D; and so forth. The bounds of an "and/or" list are defined by the complete set of combinations and permutations for the list.

Where multiples of a particular element are shown in a figure, and where it is clear that the element is duplicated throughout the figure, only one label may be provided for the element, despite multiple instances of the element being present in the figure. Accordingly, other instances in the figure of the element having identical or similar structure and/or function may not have been redundantly labeled. A person having ordinary skill in the art will recognize based on the disclosure herein redundant and/or duplicated elements of the same FIG. Despite this, redundant labeling may be included where helpful in clarifying the structure of the depicted examples.

The Applicant reserves the right to submit claims directed to combinations and sub combinations of the disclosed examples that are believed to be novel and non-obvious. Examples embodied in other combinations and sub-combinations of features, functions, elements and/or properties may be claimed through amendment of those claims or presentation of new claims in the present application or in a related application. Such amended or new claims, whether they are directed to the same example or a different example and whether they are different, broader, narrower, or equal in scope to the original claims, are to be considered within the subject matter of the examples described herein.

All patents and published patent applications referred to herein are incorporated herein by reference. The invention has been described with reference to various specific and preferred embodiments and techniques. Nevertheless, it is understood that many variations and modifications may be made while remaining within the spirit and scope of the invention.

What is claimed is:

1. A vehicle configured to operate in a normal steering mode and a differential steering mode, the vehicle comprising:
   a first, second and third wheel, with the first and second wheels disposed on opposite sides of the vehicle;
   a first and second motor, each independently controllable by a motor controller to rotate at varying rotational speeds, with the first motor driving the first wheel and the second motor driving the second wheel;
   a steering wheel connected by a steering shaft to a steering mechanism to change the angle of travel of at least one of the first, second and third wheels when the vehicle is operating in the normal steering mode;
   a steering lock mechanism to lock the steering mechanism and thereby lock the angle of travel of the at least one of the first, second and third wheels in a fixed angle of travel when the vehicle is operating in the differential steering mode;
   a sensor for sensing the direction the steering wheel is turned, at least when the vehicle is operating in the differential steering mode;
   wherein, when the vehicle is operating in the differential steering mode, a signal from the sensor is received by the motor controller, whereupon the motor controller causes the first and second motors to rotate the first and second wheels at different rotational speeds to thereby turn the vehicle in the same direction the steering wheel is turned.

2. The vehicle of claim 1, wherein the vehicle further comprises a steering power assist system, and wherein the steering power assist system is configured to operate as the steering lock mechanism.

3. The vehicle of claim 1, wherein when the vehicle is operated in the differential steering mode, the motor controller causes the first and second motors to rotate the first and second wheels in opposite directions.

4. The vehicle of claim 1, wherein the sensor for sensing the direction the steering wheel is being turned, when the vehicle is operating in the differential steering mode, is a strain gauge.

5. The vehicle of claim 1, further comprising a fourth wheel, with the first and second wheels disposed on opposite sides of the vehicle, and the third and fourth wheels disposed on opposite sides of the vehicle.

6. The vehicle of claim 5, wherein the first motor drives the first and third wheels and the second motor drives the second and fourth wheels.

7. The vehicle of claim 6, further comprising a third and fourth motor, wherein the third motor drives the third wheel and the fourth motor drives the fourth wheel, whereby the rotational speed of all four motors is independently controllable.

8. The vehicle of claim 7, wherein when the vehicle is operating in the differential steering mode, the motor controller causes the first and third motors to cause the first and third wheels to rotate in a first direction and causes the second and fourth motors to cause the second and fourth wheels to rotated in a second and opposite direction.

9. The vehicle of claim 1, wherein when the vehicle is operating in the differential steering mode, the steering mechanism lock locks the angle of travel of the at least one of the first, second, or third wheels parallel to a longitudinal axis of the vehicle.

10. The vehicle of claim 1, wherein the motor controller will not allow the steering mode to be changed unless the vehicle is stopped, and the steering wheel is placed in a substantially neutral position.

11. The vehicle of claim 9, wherein the motor controller will not allow the vehicle to travel at a speed above an upper limit when the vehicle is operating in the differential steering mode.

12. The vehicle of claim 11, wherein the upper limit is five miles per hour.

13. A vehicle configured to operate in a normal steering mode and a differential steering mode, the vehicle comprising;
  a first, second, third, and fourth wheel with the first and second wheels disposed on opposite sides of the vehicle and with the third and fourth wheels disposed on opposite sides of the vehicle;
  a first and second motor, each independently controllable by a motor controller to rotate at varying rotational speeds, with the first motor driving the first wheel and the second motor driving the second wheel;
  a steering wheel connected by a steering shaft to a steering mechanism to change the angle of travel of either the first and second wheels or the third and fourth wheels when the vehicle is operating in the normal steering mode;
  a steering lock mechanism to lock the steering mechanism and thereby lock the angle of travel of the wheels, whose angle is otherwise changed by the steering mechanism when the vehicle is operating in the differential steering mode;
  a sensor for sensing the direction the steering wheel is turned, at least when the vehicle is operating in the differential steering mode;
  wherein, when the vehicle is operating in the differential steering mode, a signal from the sensor is received by the motor controller, whereupon the motor controller causes the first and second motors to rotate the first and second wheels at different rotational speeds to thereby turn the vehicle in the same direction the steering wheel is turned.

14. The vehicle of claim 13, further comprising a third motor driving the third wheel and a fourth motor driving the fourth wheel, wherein all the motors are independently controllable, by the motor controller.

15. The vehicle of claim 14, wherein when vehicle is operating in the differential steering mode, the steering mechanism lock locks the angle of travel of the first and second wheels or third and fourth wheels at an angle parallel to a longitudinal axis of the vehicle.

16. The vehicle of claim 15, wherein when the vehicle is operating in the differential steering mode, the wheels on one side of the vehicle are rotated in a first direction and the wheels on the other side of the vehicle are rotated in a second opposite direction.

17. The vehicle of claim 13, wherein the motor controller will not allow the steering mode to be changed unless the vehicle is stopped, and the steering wheel is placed in a substantially neutral position.

18. The vehicle of claim 13, wherein the motor controller will not allow the vehicle to travel at a speed above an upper limit, when the vehicle is operating in the differential steering mode.

19. The vehicle of claim 18, wherein the upper limit is five miles per hour.

20. The vehicle of claim 13, wherein the steering mode is automatically selected based on driving conditions and speed of the vehicle.

* * * * *